(12) United States Patent
Rawlins et al.

(10) Patent No.: US 7,233,969 B2
(45) Date of Patent: Jun. 19, 2007

(54) METHOD AND APPARATUS FOR A PARALLEL CORRELATOR AND APPLICATIONS THEREOF

(75) Inventors: Gregory S. Rawlins, Heathrow, FL (US); Michael W. Rawlins, Lake Mary, FL (US); David F. Sorrells, Middleburg, FL (US)

(73) Assignee: ParkerVision, Inc., Jacksonville, FL (US)

( * ) Notice: Subject to any disclaimer, the term of this patent is extended or adjusted under 35 U.S.C. 154(b) by 0 days.

(21) Appl. No.: 11/107,861

(22) Filed: Apr. 18, 2005

(65) Prior Publication Data

US 2005/0193049 A1 Sep. 1, 2005

Related U.S. Application Data

(63) Continuation of application No. 09/987,193, filed on Nov. 13, 2001, now Pat. No. 7,010,559.

(60) Provisional application No. 60/248,001, filed on Nov. 14, 2000.

(51) Int. Cl.
G06F 17/15 (2006.01)
(52) U.S. Cl. .................. 708/422; 708/314; 708/319
(58) Field of Classification Search ............... 708/422, 708/314, 319
See application file for complete search history.

(56) References Cited

U.S. PATENT DOCUMENTS 2,057,613 A 10/1936 Gardner (Continued)

FOREIGN PATENT DOCUMENTS

DE 1936252 1/1971

(Continued)

OTHER PUBLICATIONS

Gaudiosi, J., "Retailers will bundle Microsoft's Xbox with games and peripherals," *Video Store Magazine*, vol. 23, Issue 36, p. 8, 2 pages (Sep. 2-8, 2001).

(Continued)

*Primary Examiner*—D. H. Malzahn
(74) *Attorney, Agent, or Firm*—Sterne, Kessler, Goldstein & Fox P.L.L.C.

(57) ABSTRACT

A fast correlator transform (FCT) algorithm and methods and systems for implementing same, correlate an encoded data word $(X_0-X_{M-1})$ with encoding coefficients $(C_0-C_{M-1})$, wherein each of $(X_0-X_{M-1})$ is represented by one or more bits and each said coefficient is represented by one or more bits, wherein each coefficient has k possible states, and wherein M is greater than 1. In accordance with the invention, $X_0$ is multiplied by each state $(C_{0(0)}$ through $C_{0(k-1)})$ of the coefficient $C_0$, thereby generating results $X_0C_{0(0)}$ through $X_0C_{0(k-1)}$. This is repeating for data bits $(X_1-X_{M-1})$ and corresponding coefficients $(C_1-C_{M-1})$, respectively. The results are grouped into N groups. Members of each of the N groups are added to one another, thereby generating a first layer of correlation results. The first layer of results is grouped and the members of each group are summed with one another to generate a second layer of results. This process is repeated as necessary until a final layer of results is generated. The final layer of results includes a separate correlation output for each possible state of the complete set of coefficients $(C_0-C_{M-1})$. The final layer of results is compared to identify a most likely code encoded on said data word. In an embodiment, the summations are pruned to exclude summations that would result in invalid combinations of the encoding coefficients $(C_0-C_{M-1})$. In an embodiment, substantially the same hardware is utilized for processing in-phase and quadrature phase components of the data word $(X_0-X_{M-1})$. In an embodiment, the coefficients $(C_0-C_{M-1})$ represent real numbers. In an alternative embodiment, the coefficients $(C_0-C_{M-1})$ represent complex numbers. In an embodiment, the coefficients $(C_0-C_{M-1})$ are represented with a single bit. Alternatively, the coefficients $(C_0-C_{M-1})$ are represented with multiple bits (e.g., magnitude). In an embodiment, the coefficients $(C_0-C_{M-1})$ represent a cyclic code keying ("CCK") code set substantially in accordance with IEEE 802.11 WLAN standard.

23 Claims, 11 Drawing Sheets

U.S. PATENT DOCUMENTS

| | | |
|---|---|---|
| 2,241,078 A | 5/1941 | Vreeland |
| 2,270,385 A | 1/1942 | Skillman |
| 2,283,575 A | 5/1942 | Roberts |
| 2,358,152 A | 9/1944 | Earp |
| 2,410,350 A | 10/1946 | Labin et al. |
| 2,451,430 A | 10/1948 | Barone |
| 2,462,069 A | 2/1949 | Chatterjea et al. |
| 2,462,181 A | 2/1949 | Grosselfinger |
| 2,472,798 A | 6/1949 | Fredendall |
| 2,497,859 A | 2/1950 | Boughtwood et al. |
| 2,499,279 A | 2/1950 | Peterson |
| 2,530,824 A | 11/1950 | King |
| 2,802,208 A | 8/1957 | Hobbs |
| 2,985,875 A | 5/1961 | Grisdale et al. |
| 3,023,309 A | 2/1962 | Foulkes |
| 3,069,679 A | 12/1962 | Sweeney et al. |
| 3,104,393 A | 9/1963 | Vogelman |
| 3,114,106 A | 12/1963 | McManus |
| 3,118,117 A | 1/1964 | King et al. |
| 3,226,643 A | 12/1965 | McNair |
| 3,246,084 A | 4/1966 | Kryter |
| 3,258,694 A | 6/1966 | Shepherd |
| 3,383,598 A | 5/1968 | Sanders |
| 3,384,822 A | 5/1968 | Miyagi |
| 3,454,718 A | 7/1969 | Perreault |
| 3,523,291 A | 8/1970 | Pierret |
| 3,548,342 A | 12/1970 | Maxey |
| 3,555,428 A | 1/1971 | Perreault |
| 3,614,627 A | 10/1971 | Runyan et al. |
| 3,614,630 A | 10/1971 | Rorden |
| 3,617,892 A | 11/1971 | Hawley et al. |
| 3,617,898 A | 11/1971 | Janning, Jr. |
| 3,621,402 A | 11/1971 | Gardner |
| 3,622,885 A | 11/1971 | Oberdorf et al. |
| 3,623,160 A | 11/1971 | Giles et al. |
| 3,626,417 A | 12/1971 | Gilbert |
| 3,629,696 A | 12/1971 | Bartelink |
| 3,641,442 A | 2/1972 | Boucher |
| 3,662,268 A | 5/1972 | Gans et al. |
| 3,689,841 A | 9/1972 | Bello et al. |
| 3,694,754 A | 9/1972 | Baltzer |
| 3,702,440 A | 11/1972 | Moore |
| 3,714,577 A | 1/1973 | Hayes |
| 3,716,730 A | 2/1973 | Cerny, Jr. |
| 3,717,844 A | 2/1973 | Barret et al. |
| 3,719,903 A | 3/1973 | Goodson |
| 3,735,048 A | 5/1973 | Tomsa et al. |
| 3,736,513 A | 5/1973 | Wilson |
| 3,737,778 A | 6/1973 | Van Gerwen et al. |
| 3,739,282 A | 6/1973 | Bruch et al. |
| 3,764,921 A | 10/1973 | Huard |
| 3,767,984 A | 10/1973 | Shinoda et al. |
| 3,806,811 A | 4/1974 | Thompson |
| 3,852,530 A | 12/1974 | Shen |
| 3,868,601 A | 2/1975 | MacAfee |
| 3,940,697 A | 2/1976 | Morgan |
| 3,949,300 A | 4/1976 | Sadler |
| 3,967,202 A | 6/1976 | Batz |
| 3,980,945 A | 9/1976 | Bickford |
| 3,987,280 A | 10/1976 | Bauer |
| 3,991,277 A | 11/1976 | Hirata |
| 4,003,002 A | 1/1977 | Snijders et al. |
| 4,013,966 A | 3/1977 | Campbell |
| 4,016,366 A | 4/1977 | Kurata |
| 4,017,798 A | 4/1977 | Gordy et al. |
| 4,019,140 A | 4/1977 | Swerdlow |
| 4,032,847 A | 6/1977 | Unkauf |
| 4,035,732 A | 7/1977 | Lohrmann |
| 4,045,740 A | 8/1977 | Baker |
| 4,047,121 A | 9/1977 | Campbell |
| 4,051,475 A | 9/1977 | Campbell |
| 4,066,841 A | 1/1978 | Young |
| 4,066,919 A | 1/1978 | Huntington |
| 4,080,573 A | 3/1978 | Howell |
| 4,081,748 A | 3/1978 | Batz |
| 4,115,737 A | 9/1978 | Hongu et al. |
| 4,130,765 A | 12/1978 | Arakelian et al. |
| 4,130,806 A | 12/1978 | Van Gerwen et al. |
| 4,132,952 A | 1/1979 | Hongu et al. |
| 4,142,155 A | 2/1979 | Adachi |
| 4,143,322 A | 3/1979 | Shimamura |
| 4,158,149 A | 6/1979 | Otofuji |
| 4,170,764 A | 10/1979 | Salz et al. |
| 4,204,171 A | 5/1980 | Sutphin, Jr. |
| 4,210,872 A | 7/1980 | Gregorian |
| 4,220,977 A | 9/1980 | Yamanaka |
| 4,241,451 A | 12/1980 | Maixner et al. |
| 4,245,355 A | 1/1981 | Pascoe et al. |
| 4,250,458 A | 2/1981 | Richmond et al. |
| 4,253,066 A | 2/1981 | Fisher et al. |
| 4,253,067 A | 2/1981 | Caples et al. |
| 4,253,069 A | 2/1981 | Nossek |
| 4,286,283 A | 8/1981 | Clemens |
| 4,308,614 A | 12/1981 | Fisher et al. |
| 4,320,361 A | 3/1982 | Kikkert |
| 4,320,536 A | 3/1982 | Dietrich |
| 4,334,324 A | 6/1982 | Hoover |
| 4,346,477 A | 8/1982 | Gordy |
| 4,355,401 A | 10/1982 | Ikoma et al. |
| 4,356,558 A | 10/1982 | Owen et al. |
| 4,360,867 A | 11/1982 | Gonda |
| 4,363,132 A | 12/1982 | Collin |
| 4,365,217 A | 12/1982 | Berger et al. |
| 4,369,522 A | 1/1983 | Cerny, Jr. et al. |
| 4,370,572 A | 1/1983 | Cosand et al. |
| 4,380,828 A | 4/1983 | Moon |
| 4,384,357 A | 5/1983 | deBuda et al. |
| 4,389,579 A | 6/1983 | Stein |
| 4,392,255 A | 7/1983 | Del Giudice |
| 4,393,395 A | 7/1983 | Hacke et al. |
| 4,430,629 A | 2/1984 | Betzl et al. |
| 4,439,787 A | 3/1984 | Mogi et al. |
| 4,441,080 A | 4/1984 | Saari |
| 4,446,438 A | 5/1984 | Chang et al. |
| 4,456,990 A | 6/1984 | Fisher et al. |
| 4,470,145 A | 9/1984 | Williams |
| 4,472,785 A | 9/1984 | Kasuga |
| 4,479,226 A | 10/1984 | Prabhu et al. |
| 4,481,490 A | 11/1984 | Huntley |
| 4,481,642 A | 11/1984 | Hanson |
| 4,483,017 A | 11/1984 | Hampel et al. |
| 4,484,143 A | 11/1984 | French et al. |
| 4,485,488 A | 11/1984 | Houdart |
| 4,488,119 A | 12/1984 | Marshall |
| 4,504,803 A | 3/1985 | Lee et al. |
| 4,510,467 A | 4/1985 | Chang et al. |
| 4,517,519 A | 5/1985 | Mukaiyama |
| 4,517,520 A | 5/1985 | Ogawa |
| 4,518,935 A | 5/1985 | van Roermund |
| 4,521,892 A | 6/1985 | Vance et al. |
| 4,562,414 A | 12/1985 | Linder et al. |
| 4,563,773 A | 1/1986 | Dixon, Jr. et al. |
| 4,577,157 A | 3/1986 | Reed |
| 4,583,239 A | 4/1986 | Vance |
| 4,591,736 A | 5/1986 | Hirao et al. |
| 4,591,930 A | 5/1986 | Baumeister |
| 4,602,220 A | 7/1986 | Kurihara |
| 4,603,300 A | 7/1986 | Welles, II et al. |
| 4,612,464 A | 9/1986 | Ishikawa et al. |
| 4,612,518 A | 9/1986 | Gans et al. |
| 4,616,191 A | 10/1986 | Galani et al. |
| 4,621,217 A | 11/1986 | Saxe et al. |
| 4,628,517 A | 12/1986 | Schwarz et al. |
| 4,633,510 A | 12/1986 | Suzuki et al. |

| | | | | | |
|---|---|---|---|---|---|
| 4,634,998 A | 1/1987 | Crawford | 4,995,055 A | 2/1991 | Weinberger et al. |
| 4,648,021 A | 3/1987 | Alberkrack | 5,003,621 A | 3/1991 | Gailus |
| 4,651,034 A | 3/1987 | Sato | 5,005,169 A | 4/1991 | Bronder et al. |
| 4,653,117 A | 3/1987 | Heck | 5,006,810 A | 4/1991 | Popescu |
| 4,660,164 A | 4/1987 | Leibowitz | 5,010,585 A | 4/1991 | Garcia |
| 4,675,882 A | 6/1987 | Lillie et al. | 5,012,245 A | 4/1991 | Scott et al. |
| 4,688,253 A | 8/1987 | Gumm | 5,014,130 A | 5/1991 | Heister et al. |
| 4,716,376 A | 12/1987 | Daudelin | 5,014,304 A | 5/1991 | Nicollini et al. |
| 4,716,388 A | 12/1987 | Jacobs | 5,015,963 A | 5/1991 | Sutton |
| 4,718,113 A | 1/1988 | Rother et al. | 5,016,242 A | 5/1991 | Tang |
| 4,726,041 A | 2/1988 | Prohaska et al. | 5,017,924 A | 5/1991 | Guiberteau et al. |
| 4,733,403 A | 3/1988 | Simone | 5,020,149 A | 5/1991 | Hemmie |
| 4,734,591 A | 3/1988 | Ichitsubo | 5,020,154 A | 5/1991 | Zierhut |
| 4,737,969 A | 4/1988 | Steel et al. | 5,052,050 A | 9/1991 | Collier et al. |
| 4,740,675 A | 4/1988 | Brosnan et al. | 5,058,107 A | 10/1991 | Stone et al. |
| 4,740,792 A | 4/1988 | Sagey et al. | 5,062,122 A | 10/1991 | Pham et al. |
| 4,743,858 A | 5/1988 | Everard | 5,063,387 A | 11/1991 | Mower |
| 4,745,463 A | 5/1988 | Lu | 5,065,409 A | 11/1991 | Hughes et al. |
| 4,751,468 A | 6/1988 | Agoston | 5,083,050 A | 1/1992 | Vasile |
| 4,757,538 A | 7/1988 | Zink | 5,091,921 A | 2/1992 | Minami |
| 4,761,798 A | 8/1988 | Griswold, Jr. et al. | 5,095,533 A | 3/1992 | Loper et al. |
| 4,768,187 A | 8/1988 | Marshall | 5,095,536 A | 3/1992 | Loper |
| 4,769,612 A | 9/1988 | Tamakoshi et al. | 5,111,152 A | 5/1992 | Makino |
| 4,772,853 A | 9/1988 | Hart | 5,113,094 A | 5/1992 | Grace et al. |
| 4,785,463 A | 11/1988 | Janc et al. | 5,113,129 A | 5/1992 | Hughes |
| 4,789,837 A | 12/1988 | Ridgers | 5,115,409 A | 5/1992 | Stepp |
| 4,791,584 A | 12/1988 | Greivenkamp, Jr. | 5,122,765 A | 6/1992 | Pataut |
| 4,801,823 A | 1/1989 | Yokoyama | 5,124,592 A | 6/1992 | Hagino |
| 4,806,790 A | 2/1989 | Sone | 5,126,682 A | 6/1992 | Weinberg et al. |
| 4,810,904 A | 3/1989 | Crawford | 5,131,014 A | 7/1992 | White |
| 4,810,976 A | 3/1989 | Cowley et al. | 5,136,267 A | 8/1992 | Cabot |
| 4,811,362 A | 3/1989 | Yester, Jr. et al. | 5,140,699 A | 8/1992 | Kozak |
| 4,811,422 A | 3/1989 | Kahn | 5,140,705 A | 8/1992 | Kosuga |
| 4,814,649 A | 3/1989 | Young | 5,150,124 A | 9/1992 | Moore et al. |
| 4,816,704 A | 3/1989 | Fiori, Jr. | 5,151,661 A | 9/1992 | Caldwell et al. |
| 4,819,252 A | 4/1989 | Christopher | 5,157,687 A | 10/1992 | Tymes |
| 4,833,445 A | 5/1989 | Buchele | 5,159,710 A | 10/1992 | Cusdin |
| 4,841,265 A | 6/1989 | Watanabe et al. | 5,164,985 A | 11/1992 | Nysen et al. |
| 4,845,389 A | 7/1989 | Pyndiah et al. | 5,170,414 A | 12/1992 | Silvian |
| 4,855,894 A | 8/1989 | Asahi et al. | 5,172,019 A | 12/1992 | Naylor et al. |
| 4,857,928 A | 8/1989 | Gailus et al. | 5,172,070 A | 12/1992 | Hiraiwa et al. |
| 4,862,121 A | 8/1989 | Hochschild et al. | 5,179,731 A | 1/1993 | Tränkle et al. |
| 4,866,441 A | 9/1989 | Conway et al. | 5,191,459 A | 3/1993 | Thompson et al. |
| 4,868,654 A | 9/1989 | Juri et al. | 5,196,806 A | 3/1993 | Ichihara |
| 4,870,659 A | 9/1989 | Oishi et al. | 5,204,642 A | 4/1993 | Ashgar et al. |
| 4,871,987 A | 10/1989 | Kawase | 5,212,827 A | 5/1993 | Meszko et al. |
| 4,873,492 A | 10/1989 | Myer | 5,214,787 A | 5/1993 | Karkota, Jr. |
| 4,885,587 A | 12/1989 | Wiegand et al. | 5,218,562 A | 6/1993 | Basehore et al. |
| 4,885,671 A | 12/1989 | Peil | 5,220,583 A | 6/1993 | Solomon |
| 4,885,756 A | 12/1989 | Fontanes et al. | 5,220,680 A | 6/1993 | Lee |
| 4,888,557 A | 12/1989 | Puckette, IV et al. | 5,222,144 A | 6/1993 | Whikehart |
| 4,890,302 A | 12/1989 | Muilwijk | 5,230,097 A | 7/1993 | Currie et al. |
| 4,893,316 A | 1/1990 | Janc et al. | 5,239,496 A | 8/1993 | Vancraeynest |
| 4,893,341 A | 1/1990 | Gehring | 5,239,686 A | 8/1993 | Downey |
| 4,894,766 A | 1/1990 | De Agro | 5,239,687 A | 8/1993 | Chen |
| 4,896,152 A | 1/1990 | Tiemann | 5,241,561 A | 8/1993 | Barnard |
| 4,902,979 A | 2/1990 | Puckette, IV | 5,249,203 A | 9/1993 | Loper |
| 4,908,579 A | 3/1990 | Tawfik et al. | 5,251,218 A | 10/1993 | Stone et al. |
| 4,910,752 A | 3/1990 | Yester, Jr. et al. | 5,251,232 A | 10/1993 | Nonami |
| 4,914,405 A | 4/1990 | Wells | 5,260,970 A | 11/1993 | Henry et al. |
| 4,920,510 A | 4/1990 | Senderowicz et al. | 5,260,973 A | 11/1993 | Watanabe |
| 4,922,452 A | 5/1990 | Larsen et al. | 5,263,194 A | 11/1993 | Ragan |
| 4,931,716 A | 6/1990 | Jovanovic et al. | 5,263,196 A | 11/1993 | Jasper |
| 4,931,921 A | 6/1990 | Anderson | 5,263,198 A | 11/1993 | Geddes et al. |
| 4,943,974 A | 7/1990 | Motamedi | 5,267,023 A | 11/1993 | Kawasaki |
| 4,944,025 A | 7/1990 | Gehring et al. | 5,278,826 A | 1/1994 | Murphy et al. |
| 4,955,079 A | 9/1990 | Connerney et al. | 5,282,023 A | 1/1994 | Scarpa |
| 4,965,467 A | 10/1990 | Bilterijst | 5,282,222 A | 1/1994 | Fattouche et al. |
| 4,967,160 A | 10/1990 | Quievy et al. | 5,287,516 A | 2/1994 | Schaub |
| 4,970,703 A | 11/1990 | Hariharan et al. | 5,293,398 A | 3/1994 | Hamao et al. |
| 4,972,436 A | 11/1990 | Halim et al. | 5,303,417 A | 4/1994 | Laws |
| 4,982,353 A | 1/1991 | Jacob et al. | 5,307,517 A | 4/1994 | Rich |
| 4,984,077 A | 1/1991 | Uchida | 5,315,583 A | 5/1994 | Murphy et al. |

| Patent No. | Date | Inventor |
|---|---|---|
| 5,319,799 A | 6/1994 | Morita |
| 5,321,852 A | 6/1994 | Seong |
| 5,325,204 A | 6/1994 | Scarpa |
| 5,337,014 A | 8/1994 | Najle et al. |
| 5,339,054 A | 8/1994 | Taguchi |
| 5,339,459 A | 8/1994 | Schiltz et al. |
| 5,345,239 A | 9/1994 | Madni et al. |
| 5,353,306 A | 10/1994 | Yamamoto |
| 5,355,114 A | 10/1994 | Sutterlin et al. |
| 5,361,408 A | 11/1994 | Watanabe et al. |
| 5,369,404 A | 11/1994 | Galton |
| 5,369,789 A | 11/1994 | Kosugi et al. |
| 5,369,800 A | 11/1994 | Takagi et al. |
| 5,375,146 A | 12/1994 | Chalmers |
| 5,379,040 A | 1/1995 | Mizomoto et al. |
| 5,379,141 A | 1/1995 | Thompson et al. |
| 5,388,063 A | 2/1995 | Takatori et al. |
| 5,389,839 A | 2/1995 | Heck |
| 5,390,215 A | 2/1995 | Anita et al. |
| 5,390,364 A | 2/1995 | Webster et al. |
| 5,400,084 A | 3/1995 | Scarpa |
| 5,404,127 A | 4/1995 | Lee et al. |
| 5,410,195 A | 4/1995 | Ichihara |
| 5,410,270 A | 4/1995 | Rybicki et al. |
| 5,410,326 A | 4/1995 | Goldstein |
| 5,410,541 A | 4/1995 | Hotto |
| 5,410,743 A | 4/1995 | Seely et al. |
| 5,412,352 A | 5/1995 | Graham |
| 5,416,449 A | 5/1995 | Joshi |
| 5,416,803 A | 5/1995 | Janer |
| 5,422,909 A | 6/1995 | Love et al. |
| 5,422,913 A | 6/1995 | Wilkinson |
| 5,423,082 A | 6/1995 | Cygan et al. |
| 5,428,638 A | 6/1995 | Cioffi et al. |
| 5,428,640 A | 6/1995 | Townley |
| 5,434,546 A | 7/1995 | Palmer |
| 5,438,329 A | 8/1995 | Gastouniotis et al. |
| 5,438,692 A | 8/1995 | Mohindra |
| 5,440,311 A | 8/1995 | Gallagher et al. |
| 5,444,415 A | 8/1995 | Dent et al. |
| 5,444,416 A | 8/1995 | Ishikawa et al. |
| 5,444,865 A | 8/1995 | Heck et al. |
| 5,446,421 A | 8/1995 | Kechkaylo |
| 5,446,422 A | 8/1995 | Mattila et al. |
| 5,448,602 A | 9/1995 | Ohmori et al. |
| 5,451,899 A | 9/1995 | Lawton |
| 5,454,007 A | 9/1995 | Dutta |
| 5,454,009 A | 9/1995 | Fruit et al. |
| 5,463,356 A | 10/1995 | Palmer |
| 5,463,357 A | 10/1995 | Hobden |
| 5,465,071 A | 11/1995 | Kobayashi et al. |
| 5,465,410 A | 11/1995 | Hiben et al. |
| 5,465,415 A | 11/1995 | Bien |
| 5,465,418 A | 11/1995 | Zhou et al. |
| 5,471,162 A | 11/1995 | McEwan |
| 5,471,665 A | 11/1995 | Pace et al. |
| 5,479,120 A | 12/1995 | McEwan |
| 5,479,447 A | 12/1995 | Chow et al. |
| 5,481,570 A | 1/1996 | Winters |
| 5,483,193 A | 1/1996 | Kennedy et al. |
| 5,483,549 A | 1/1996 | Weinberg et al. |
| 5,483,600 A | 1/1996 | Werrbach |
| 5,483,691 A | 1/1996 | Heck et al. |
| 5,483,695 A | 1/1996 | Pardoen |
| 5,490,173 A | 2/1996 | Whikehart et al. |
| 5,490,176 A | 2/1996 | Peltier |
| 5,493,581 A | 2/1996 | Young et al. |
| 5,493,721 A | 2/1996 | Reis |
| 5,495,200 A | 2/1996 | Kwan et al. |
| 5,495,202 A | 2/1996 | Hsu |
| 5,495,500 A | 2/1996 | Jovanovich et al. |
| 5,499,267 A | 3/1996 | Ohe et al. |
| 5,500,758 A | 3/1996 | Thompson et al. |
| 5,513,389 A | 4/1996 | Reeser et al. |
| 5,515,014 A | 5/1996 | Troutman |
| 5,517,688 A | 5/1996 | Fajen et al. |
| 5,519,890 A | 5/1996 | Pinckley |
| 5,523,719 A | 6/1996 | Longo et al. |
| 5,523,726 A | 6/1996 | Kroeger et al. |
| 5,523,760 A | 6/1996 | McEwan |
| 5,535,402 A * | 7/1996 | Leibowitz et al. .......... 708/422 |
| 5,539,770 A | 7/1996 | Ishigaki |
| 5,551,076 A | 8/1996 | Bonn |
| 5,552,789 A | 9/1996 | Schuermann |
| 5,555,453 A | 9/1996 | Kajimoto et al. |
| 5,557,641 A | 9/1996 | Weinberg |
| 5,557,642 A | 9/1996 | Williams |
| 5,563,550 A | 10/1996 | Toth |
| 5,564,097 A | 10/1996 | Swanke |
| 5,574,755 A | 11/1996 | Persico |
| 5,579,341 A | 11/1996 | Smith et al. |
| 5,579,347 A | 11/1996 | Lindquist et al. |
| 5,584,068 A | 12/1996 | Mohindra |
| 5,589,793 A | 12/1996 | Kassapian |
| 5,592,131 A | 1/1997 | Labreche et al. |
| 5,600,680 A | 2/1997 | Mishima et al. |
| 5,602,847 A | 2/1997 | Pagano et al. |
| 5,602,868 A | 2/1997 | Wilson |
| 5,604,592 A | 2/1997 | Kotidis et al. |
| 5,604,732 A | 2/1997 | Kim et al. |
| 5,606,731 A | 2/1997 | Pace et al. |
| 5,608,531 A | 3/1997 | Honda et al. |
| 5,610,946 A | 3/1997 | Tanaka et al. |
| RE35,494 E | 4/1997 | Nicollini |
| 5,617,451 A | 4/1997 | Mimura et al. |
| 5,619,538 A | 4/1997 | Sempel et al. |
| 5,621,455 A | 4/1997 | Rogers et al. |
| 5,628,055 A | 5/1997 | Stein |
| 5,630,227 A | 5/1997 | Bella et al. |
| 5,633,610 A | 5/1997 | Maekawa et al. |
| 5,633,815 A | 5/1997 | Young |
| 5,634,207 A | 5/1997 | Yamaji et al. |
| 5,636,140 A | 6/1997 | Lee et al. |
| 5,638,396 A | 6/1997 | Klimek |
| 5,640,415 A | 6/1997 | Pandula |
| 5,640,424 A | 6/1997 | Banavong et al. |
| 5,640,428 A | 6/1997 | Abe et al. |
| 5,640,698 A | 6/1997 | Shen et al. |
| 5,642,071 A | 6/1997 | Sevenhans et al. |
| 5,648,985 A | 7/1997 | Bjerede et al. |
| 5,650,785 A | 7/1997 | Rodal |
| 5,661,424 A | 8/1997 | Tang |
| 5,663,878 A | 9/1997 | Walker |
| 5,663,986 A | 9/1997 | Striffler |
| 5,668,836 A | 9/1997 | Smith et al. |
| 5,675,392 A | 10/1997 | Nayebi et al. |
| 5,678,220 A | 10/1997 | Fournier |
| 5,678,226 A | 10/1997 | Li et al. |
| 5,680,078 A | 10/1997 | Ariie |
| 5,680,418 A | 10/1997 | Croft et al. |
| 5,682,099 A | 10/1997 | Thompson et al. |
| 5,689,413 A | 11/1997 | Jaramillo et al. |
| 5,694,096 A | 12/1997 | Ushiroku et al. |
| 5,697,074 A | 12/1997 | Makikallio et al. |
| 5,699,006 A | 12/1997 | Zele et al. |
| 5,703,584 A | 12/1997 | Hill |
| 5,705,949 A | 1/1998 | Alelyunas et al. |
| 5,705,955 A | 1/1998 | Freeburg et al. |
| 5,710,992 A | 1/1998 | Sawada et al. |
| 5,710,998 A | 1/1998 | Opas |
| 5,714,910 A | 2/1998 | Skoczen et al. |
| 5,715,281 A | 2/1998 | Bly et al. |
| 5,721,514 A | 2/1998 | Crockett et al. |
| 5,724,002 A | 3/1998 | Hulick |
| 5,724,653 A | 3/1998 | Baker et al. |
| 5,729,577 A | 3/1998 | Chen |

| Patent | | Date | Inventor |
|---|---|---|---|
| 5,729,829 | A | 3/1998 | Talwar et al. |
| 5,732,333 | A | 3/1998 | Cox et al. |
| 5,734,683 | A | 3/1998 | Hulkko et al. |
| 5,736,895 | A | 4/1998 | Yu et al. |
| 5,737,035 | A | 4/1998 | Rotzoll |
| 5,742,189 | A | 4/1998 | Yoshida et al. |
| 5,745,846 | A | 4/1998 | Myer et al. |
| 5,748,683 | A | 5/1998 | Smith et al. |
| 5,751,154 | A | 5/1998 | Tsugai |
| 5,757,858 | A | 5/1998 | Black et al. |
| 5,757,870 | A | 5/1998 | Miya et al. |
| RE35,829 | E | 6/1998 | Sanderford, Jr. |
| 5,760,629 | A | 6/1998 | Urabe et al. |
| 5,760,632 | A | 6/1998 | Kawakami et al. |
| 5,760,645 | A | 6/1998 | Comte et al. |
| 5,764,087 | A | 6/1998 | Clark |
| 5,767,726 | A | 6/1998 | Wang |
| 5,768,118 | A | 6/1998 | Faulk et al. |
| 5,768,323 | A | 6/1998 | Kroeger et al. |
| 5,770,985 | A | 6/1998 | Ushiroku et al. |
| 5,771,442 | A | 6/1998 | Wang et al. |
| 5,777,692 | A | 7/1998 | Ghosh |
| 5,777,771 | A | 7/1998 | Smith |
| 5,778,022 | A | 7/1998 | Walley |
| 5,784,689 | A | 7/1998 | Kobayashi |
| 5,786,844 | A | 7/1998 | Rogers et al. |
| 5,787,125 | A | 7/1998 | Mittel |
| 5,790,587 | A | 8/1998 | Smith et al. |
| 5,793,801 | A | 8/1998 | Fertner |
| 5,793,817 | A | 8/1998 | Wilson |
| 5,793,818 | A | 8/1998 | Claydon et al. |
| 5,801,654 | A | 9/1998 | Traylor |
| 5,802,463 | A | 9/1998 | Zuckerman |
| 5,805,460 | A | 9/1998 | Greene et al. |
| 5,809,060 | A | 9/1998 | Cafarella et al. |
| 5,812,546 | A | 9/1998 | Zhou et al. |
| 5,818,582 | A | 10/1998 | Fernandez et al. |
| 5,818,869 | A | 10/1998 | Miya et al. |
| 5,825,254 | A | 10/1998 | Lee |
| 5,825,257 | A | 10/1998 | Klymyshyn et al. |
| 5,834,979 | A | 11/1998 | Yatsuka |
| 5,834,985 | A | 11/1998 | Sundegård |
| 5,834,987 | A | 11/1998 | Dent |
| 5,841,324 | A | 11/1998 | Williams |
| 5,841,811 | A | 11/1998 | Song |
| 5,844,449 | A | 12/1998 | Abeno et al. |
| 5,844,868 | A | 12/1998 | Takahashi et al. |
| 5,847,594 | A | 12/1998 | Mizuno |
| 5,859,878 | A | 1/1999 | Phillips et al. |
| 5,864,754 | A | 1/1999 | Hotto |
| 5,870,670 | A | 2/1999 | Ripley et al. |
| 5,872,446 | A | 2/1999 | Cranford, Jr. et al. |
| 5,878,088 | A | 3/1999 | Knutson et al. |
| 5,881,375 | A | 3/1999 | Bonds |
| 5,883,548 | A | 3/1999 | Assard et al. |
| 5,887,001 | A | 3/1999 | Russell |
| 5,892,380 | A | 4/1999 | Quist |
| 5,894,239 | A | 4/1999 | Bonaccio et al. |
| 5,894,496 | A | 4/1999 | Jones |
| 5,896,304 | A | 4/1999 | Tiemann et al. |
| 5,896,562 | A | 4/1999 | Heinonen |
| 5,898,912 | A | 4/1999 | Heck et al. |
| 5,900,747 | A | 5/1999 | Brauns |
| 5,901,054 | A | 5/1999 | Leu et al. |
| 5,901,187 | A | 5/1999 | Iinuma |
| 5,901,344 | A | 5/1999 | Opas |
| 5,901,347 | A | 5/1999 | Chambers et al. |
| 5,901,348 | A | 5/1999 | Bang et al. |
| 5,901,349 | A | 5/1999 | Guegnaud et al. |
| 5,903,178 | A | 5/1999 | Miyatsuji et al. |
| 5,903,187 | A | 5/1999 | Claverie et al. |
| 5,903,196 | A | 5/1999 | Salvi et al. |
| 5,903,421 | A | 5/1999 | Furutani et al. |
| 5,903,553 | A | 5/1999 | Sakamoto et al. |
| 5,903,595 | A | 5/1999 | Suzuki |
| 5,903,609 | A | 5/1999 | Kool et al. |
| 5,903,827 | A | 5/1999 | Kennan et al. |
| 5,903,854 | A | 5/1999 | Abe et al. |
| 5,905,433 | A | 5/1999 | Wortham |
| 5,905,449 | A | 5/1999 | Tsubouchi et al. |
| 5,907,149 | A | 5/1999 | Marckini |
| 5,907,197 | A | 5/1999 | Faulk |
| 5,909,447 | A | 6/1999 | Cox et al. |
| 5,911,116 | A | 6/1999 | Nosswitz |
| 5,911,123 | A | 6/1999 | Shaffer et al. |
| 5,914,622 | A | 6/1999 | Inoue |
| 5,915,278 | A | 6/1999 | Mallick |
| 5,918,167 | A | 6/1999 | Tiller et al. |
| 5,920,199 | A | 7/1999 | Sauer |
| 5,926,065 | A | 7/1999 | Wakai et al. |
| 5,926,513 | A | 7/1999 | Suominen et al. |
| 5,933,467 | A | 8/1999 | Sehier et al. |
| 5,937,013 | A | 8/1999 | Lam et al. |
| 5,943,370 | A | 8/1999 | Smith |
| 5,945,660 | A | 8/1999 | Nakasuji et al. |
| 5,949,827 | A | 9/1999 | DeLuca et al. |
| 5,952,895 | A | 9/1999 | McCune, Jr. et al. |
| 5,953,642 | A | 9/1999 | Feldtkeller et al. |
| 5,955,992 | A | 9/1999 | Shattil |
| 5,956,025 | A | 9/1999 | Goulden et al. |
| 5,959,850 | A | 9/1999 | Lim |
| 5,960,033 | A | 9/1999 | Shibano et al. |
| 5,970,053 | A | 10/1999 | Schick et al. |
| 5,982,315 | A | 11/1999 | Bazarjani et al. |
| 5,982,329 | A | 11/1999 | Pittman et al. |
| 5,986,600 | A | 11/1999 | McEwan |
| 5,994,689 | A | 11/1999 | Charrier |
| 5,995,030 | A | 11/1999 | Cabler |
| 5,999,561 | A | 12/1999 | Naden et al. |
| 6,005,506 | A | 12/1999 | Bazarjani et al. |
| 6,005,903 | A | 12/1999 | Mendelovicz |
| 6,011,435 | A | 1/2000 | Takeyabu et al. |
| 6,014,176 | A | 1/2000 | Nayebi et al. |
| 6,014,551 | A | 1/2000 | Pesola et al. |
| 6,018,262 | A | 1/2000 | Noro et al. |
| 6,018,553 | A | 1/2000 | Sanielevici et al. |
| 6,026,286 | A | 2/2000 | Long |
| 6,028,887 | A | 2/2000 | Harrison et al. |
| 6,031,217 | A | 2/2000 | Aswell et al. |
| 6,034,566 | A | 3/2000 | Ohe |
| 6,041,073 | A | 3/2000 | Davidovici et al. |
| 6,047,026 | A | 4/2000 | Chao et al. |
| 6,049,573 | A | 4/2000 | Song |
| 6,049,706 | A | 4/2000 | Cook et al. |
| 6,054,889 | A | 4/2000 | Kobayashi |
| 6,057,714 | A | 5/2000 | Andrys et al. |
| 6,061,551 | A | 5/2000 | Sorrells et al. |
| 6,061,555 | A | 5/2000 | Bultman et al. |
| 6,064,054 | A | 5/2000 | Waczynski et al. |
| 6,067,329 | A | 5/2000 | Kato et al. |
| 6,073,001 | A | 6/2000 | Sokoler |
| 6,076,015 | A | 6/2000 | Hartley et al. |
| 6,078,630 | A | 6/2000 | Prasanna |
| 6,081,691 | A | 6/2000 | Renard et al. |
| 6,084,465 | A | 7/2000 | Dasgupta |
| 6,084,922 | A | 7/2000 | Zhou et al. |
| 6,085,073 | A | 7/2000 | Palermo et al. |
| 6,091,289 | A | 7/2000 | Song et al. |
| 6,091,939 | A | 7/2000 | Banh |
| 6,091,940 | A | 7/2000 | Sorrells et al. |
| 6,091,941 | A | 7/2000 | Moriyama et al. |
| 6,094,084 | A | 7/2000 | Abou-Allam et al. |
| 6,098,046 | A | 8/2000 | Cooper et al. |
| 6,098,886 | A | 8/2000 | Swift et al. |
| 6,121,819 | A | 9/2000 | Traylor |
| 6,125,271 | A | 9/2000 | Rowland et al. |

| | | |
|---|---|---|
| 6,127,941 A | 10/2000 | Van Ryzin |
| 6,144,236 A | 11/2000 | Vice et al. |
| 6,144,331 A | 11/2000 | Jiang |
| 6,144,846 A | 11/2000 | Durec |
| 6,147,340 A | 11/2000 | Levy |
| 6,147,763 A | 11/2000 | Steinlechner |
| 6,150,890 A | 11/2000 | Damgaard et al. |
| 6,151,354 A | 11/2000 | Abbey |
| 6,160,280 A | 12/2000 | Bonn et al. |
| 6,169,733 B1 | 1/2001 | Lee |
| 6,175,728 B1 | 1/2001 | Mitama |
| 6,178,319 B1 | 1/2001 | Kashima |
| 6,182,011 B1 | 1/2001 | Ward |
| 6,204,789 B1 | 3/2001 | Nagata |
| 6,208,636 B1 | 3/2001 | Tawil et al. |
| RE37,138 E | 4/2001 | Dent |
| 6,211,718 B1 | 4/2001 | Souetinov |
| 6,212,369 B1 | 4/2001 | Avasarala |
| 6,215,475 B1 | 4/2001 | Meyerson et al. |
| 6,215,828 B1 | 4/2001 | Signell et al. |
| 6,225,848 B1 | 5/2001 | Tilley et al. |
| 6,230,000 B1 | 5/2001 | Tayloe |
| 6,266,518 B1 | 7/2001 | Sorrells et al. |
| 6,298,065 B1 | 10/2001 | Dombkowski et al. |
| 6,307,894 B2 | 10/2001 | Eidson et al. |
| 6,308,058 B1 | 10/2001 | Souetinov et al. |
| 6,313,685 B1 | 11/2001 | Rabii |
| 6,313,700 B1 | 11/2001 | Nishijima et al. |
| 6,314,279 B1 | 11/2001 | Mohindra |
| 6,317,589 B1 | 11/2001 | Nash |
| 6,321,073 B1 | 11/2001 | Luz et al. |
| 6,327,313 B1 | 12/2001 | Traylor et al. |
| 6,330,244 B1 | 12/2001 | Swartz et al. |
| 6,335,656 B1 | 1/2002 | Goldfarb et al. |
| 6,353,735 B1 | 3/2002 | Sorrells et al. |
| 6,363,262 B1 | 3/2002 | McNicol |
| 6,366,622 B1 | 4/2002 | Brown et al. |
| 6,370,371 B1 | 4/2002 | Sorrells et al. |
| 6,385,439 B1 | 5/2002 | Hellberg |
| 6,393,070 B1 | 5/2002 | Reber |
| 6,400,963 B1 | 6/2002 | Glöckler et al. |
| 6,404,758 B1 | 6/2002 | Wang |
| 6,404,823 B1 | 6/2002 | Grange et al. |
| 6,421,534 B1 | 7/2002 | Cook et al. |
| 6,437,639 B1 | 8/2002 | Nguyen et al. |
| 6,438,366 B1 | 8/2002 | Lindfors et al. |
| 6,441,659 B1 | 8/2002 | Demone |
| 6,441,694 B1 | 8/2002 | Turcotte et al. |
| 6,445,726 B1 | 9/2002 | Gharpurey |
| 6,459,721 B1 | 10/2002 | Mochizuki et al. |
| 6,509,777 B2 | 1/2003 | Razavi et al. |
| 6,512,544 B1 | 1/2003 | Merrill et al. |
| 6,512,785 B1 * | 1/2003 | Zhou et al. ............... 375/143 |
| 6,516,185 B1 | 2/2003 | MacNally |
| 6,531,979 B1 | 3/2003 | Hynes |
| 6,542,722 B1 | 4/2003 | Sorrells et al. |
| 6,560,301 B1 | 5/2003 | Cook et al. |
| 6,560,451 B1 | 5/2003 | Somayajula |
| 6,567,483 B1 * | 5/2003 | Dent et al. ............... 375/343 |
| 6,580,902 B1 | 6/2003 | Sorrells et al. |
| 6,591,310 B1 | 7/2003 | Johnson |
| 6,600,795 B1 | 7/2003 | Ohta et al. |
| 6,600,911 B1 | 7/2003 | Morishige et al. |
| 6,608,647 B1 | 8/2003 | King |
| 6,611,569 B1 | 8/2003 | Schier et al. |
| 6,618,579 B1 | 9/2003 | Smith et al. |
| 6,628,328 B1 | 9/2003 | Yokouchi et al. |
| 6,633,194 B2 | 10/2003 | Arnborg et al. |
| 6,634,555 B1 | 10/2003 | Sorrells et al. |
| 6,639,939 B1 | 10/2003 | Naden et al. |
| 6,647,250 B1 | 11/2003 | Bultman et al. |
| 6,647,270 B1 | 11/2003 | Himmelstein |
| 6,686,879 B2 | 2/2004 | Shattil |
| 6,687,493 B1 | 2/2004 | Sorrells et al. |
| 6,690,232 B2 | 2/2004 | Ueno et al. |
| 6,694,128 B1 | 2/2004 | Sorrells et al. |
| 6,697,603 B1 | 2/2004 | Lovinggood et al. |
| 6,704,549 B1 | 3/2004 | Sorrells et al. |
| 6,704,558 B1 | 3/2004 | Sorrells et al. |
| 6,741,139 B2 | 5/2004 | Pleasant et al. |
| 6,741,650 B1 | 5/2004 | Painchaud et al. |
| 6,775,684 B1 * | 8/2004 | Toyoyama et al. ........ 708/314 |
| 6,798,351 B1 | 9/2004 | Sorrells et al. |
| 6,801,253 B1 | 10/2004 | Yonemoto et al. |
| 6,813,485 B2 | 11/2004 | Sorrells et al. |
| 6,823,178 B2 | 11/2004 | Pleasant et al. |
| 6,836,650 B2 | 12/2004 | Sorrells et al. |
| 6,850,742 B2 | 2/2005 | Fayyaz |
| 6,853,690 B1 | 2/2005 | Sorrells et al. |
| 6,865,399 B2 | 3/2005 | Fujioka et al. |
| 6,873,836 B1 | 3/2005 | Sorrells et al. |
| 6,879,817 B1 | 4/2005 | Sorrells et al. |
| 6,882,194 B2 | 4/2005 | Belot et al. |
| 6,892,057 B2 | 5/2005 | Nilsson |
| 6,892,062 B2 | 5/2005 | Lee et al. |
| 6,909,739 B1 | 6/2005 | Eerola et al. |
| 6,910,015 B2 | 6/2005 | Kawai |
| 6,917,796 B2 | 7/2005 | Setty et al. |
| 6,920,311 B2 | 7/2005 | Rofougaran et al. |
| 6,959,178 B2 | 10/2005 | Macedo et al. |
| 6,963,626 B1 | 11/2005 | Shaeffer et al. |
| 6,963,734 B2 | 11/2005 | Sorrells et al. |
| 6,973,476 B1 | 12/2005 | Naden et al. |
| 6,975,848 B2 | 12/2005 | Rawlins et al. |
| 6,999,747 B2 | 2/2006 | Su |
| 7,006,805 B1 | 2/2006 | Sorrells et al. |
| 7,010,286 B2 | 3/2006 | Sorrells et al. |
| 7,010,559 B2 | 3/2006 | Rawlins et al. |
| 7,016,663 B2 | 3/2006 | Sorrells et al. |
| 7,027,786 B1 | 4/2006 | Smith et al. |
| 7,039,372 B1 | 5/2006 | Sorrells et al. |
| 7,050,508 B2 | 5/2006 | Sorrells et al. |
| 7,054,296 B1 | 5/2006 | Sorrells et al. |
| 7,065,162 B1 | 6/2006 | Sorrells et al. |
| 7,072,390 B1 | 7/2006 | Sorrells et al. |
| 7,072,427 B2 | 7/2006 | Rawlins et al. |
| 7,076,011 B2 | 7/2006 | Cook et al. |
| 7,082,171 B1 | 7/2006 | Johnson et al. |
| 7,085,335 B2 | 8/2006 | Rawlins et al. |
| 7,107,028 B2 | 9/2006 | Sorrells et al. |
| 7,110,435 B1 | 9/2006 | Sorrells et al. |
| 7,110,444 B1 | 9/2006 | Sorrells et al. |
| 2001/0015673 A1 | 8/2001 | Yamashita et al. |
| 2001/0036818 A1 | 11/2001 | Dobrovolny |
| 2002/0037706 A1 | 3/2002 | Ichihara |
| 2002/0080728 A1 | 6/2002 | Sugar et al. |
| 2002/0124036 A1 | 9/2002 | Rawlins et al. |
| 2002/0132642 A1 | 9/2002 | Hines et al. |
| 2002/0163921 A1 | 11/2002 | Ethridge et al. |
| 2003/0045263 A1 | 3/2003 | Wakayama et al. |
| 2003/0081781 A1 | 5/2003 | Jensen et al. |
| 2003/0149579 A1 | 8/2003 | Begemann et al. |
| 2004/0125879 A1 | 7/2004 | Jaussl et al. |
| 2004/0230628 A1 | 11/2004 | Rawlins et al. |
| 2005/0185741 A1 | 8/2005 | Rawlins et al. |
| 2006/0039449 A1 | 2/2006 | Fontana et al. |

FOREIGN PATENT DOCUMENTS

| | | |
|---|---|---|
| DE | 35 41 031 A1 | 5/1986 |
| DE | 42 37 692 C1 | 3/1994 |
| DE | 196 27 640 A1 | 1/1997 |
| DE | 692 21 098 T2 | 1/1998 |
| DE | 196 48 915 A1 | 6/1998 |
| DE | 197 35 798 C1 | 7/1998 |
| EP | 0 035 166 A1 | 9/1981 |

| | | |
|---|---|---|
| EP | 0 087 336 A1 | 8/1983 |
| EP | 0 099 265 A1 | 1/1984 |
| EP | 0 087 336 B1 | 7/1986 |
| EP | 0 254 844 A2 | 2/1988 |
| EP | 0 276 130 A2 | 7/1988 |
| EP | 0 276 130 A3 | 7/1988 |
| EP | 0 193 899 B1 | 6/1990 |
| EP | 0 380 351 A2 | 8/1990 |
| EP | 0 380 351 A3 | 2/1991 |
| EP | 0 411 840 A2 | 2/1991 |
| EP | 0 423 718 A2 | 4/1991 |
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 288 A2 | 1/1995 |
| EP | 0 632 577 A1 | 1/1995 |
| EP | 0 643 477 A2 | 3/1995 |
| EP | 0 643 477 A3 | 3/1995 |
| EP | 0 411 840 B1 | 10/1995 |
| EP | 0 696 854 A1 | 2/1996 |
| EP | 0 632 288 A3 | 7/1996 |
| EP | 0 732 803 A1 | 9/1996 |
| EP | 0 486 095 B1 | 2/1997 |
| EP | 0 782 275 A2 | 7/1997 |
| EP | 0 785 635 A1 | 7/1997 |
| EP | 0 789 449 A2 | 8/1997 |
| EP | 0 795 955 A2 | 9/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 919 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 58-133004 | 8/1983 |
| JP | 59-144249 | 8/1984 |
| JP | 60-58705 | 4/1985 |
| JP | 60-130203 | 7/1985 |
| JP | 61-30821 | 2/1986 |
| JP | 61-232706 | 10/1986 |
| JP | 62-12381 | 1/1987 |
| JP | 63-54002 | 3/1988 |
| JP | 63-65587 | 3/1988 |
| JP | 63-153691 | 6/1988 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 4-154227 | 5/1992 |
| JP | 5-175730 | 7/1993 |
| JP | 5-175734 | 7/1993 |
| JP | 5-327356 | 12/1993 |
| JP | 6-237276 | 8/1994 |
| JP | 6-284038 | 10/1994 |
| JP | 7-154344 | 6/1995 |
| JP | 7-307620 | 11/1995 |
| JP | 8-23359 | 1/1996 |
| JP | 8-32556 | 2/1996 |
| JP | 8-139524 | 5/1996 |
| JP | 9-36664 | 2/1997 |
| JP | 9-171399 | 6/1997 |
| JP | 10-41860 | 2/1998 |
| JP | 10-96778 | 4/1998 |
| JP | 10-173563 | 6/1998 |
| JP | 11-98205 | 4/1999 |
| WO | WO 80/01633 A1 | 8/1980 |
| WO | WO 91/18445 A1 | 11/1991 |
| WO | WO 94/05087 A1 | 3/1994 |
| WO | WO 95/01006 A1 | 1/1995 |
| WO | WO 96/02977 A1 | 2/1996 |
| WO | WO 96/08078 A1 | 3/1996 |
| WO | WO 96/39750 A1 | 12/1996 |
| WO | WO 97/08839 A2 | 3/1997 |
| WO | WO 97/08839 A3 | 3/1997 |
| WO | WO 97/38490 A1 | 10/1997 |
| WO | WO 98/00953 A1 | 1/1998 |
| WO | WO 98/24201 A1 | 6/1998 |
| WO | WO 98/40968 A2 | 9/1998 |
| WO | WO 98/40968 A3 | 9/1998 |
| WO | WO 98/535566 A2 | 11/1998 |
| WO | WO 99/23755 A1 | 5/1999 |
| WO | WO 00/31659 A1 | 6/2000 |

OTHER PUBLICATIONS

English-language Translation of German Patent Publication No. DE 1936252, translation provided by Transperfect Translations, 12 pages (Jan. 28, 1971—Date of publication of application).

English-language Abstract of Japanese Patent Publication No. JP 62-12381, data supplied by the espacenet, 1 page (Jan. 21, 1987—Date of publication of application).

English-language Abstract of Japanese Patent Publication No. JP 4-154227, data supplied by the espacenet, 1 page (May 27, 1992—Date of publication of application).

English-language Abstract of Japanese Patent Publication No. JP 6-284038, data supplied by the espacenet, 1 page (Oct. 7, 1994—Date of publication of application).

English-language Abstract of Japanese Patent Publication No. JP 10-96778, data supplied by the espacenet, 1 page (Apr. 14, 1998—Date of publication of application).

English-language Abstract of Japanese Patent Publication No. JP 11-98205, data supplied by the espacenet, 1 page (Apr. 9, 1999—Date of publication of application).

Hellwarth, G.A. and Jones, G.D, "Automatic Conditioning of Speech Signals," *IEEE Transactions on Audio and Electroacoustics*, vol. AU-16, No. 2, pp. 169-179 (Jun. 1968).

English Abstract for German Patent No DE 692 21 098 T2, 1 page, data supplied from the espacenet.

Aghvami, H. et al., "Land Mobile Satellites Using the Highly Elliptic Orbits- The UK T-SAT Mobile Payload," *Fourth International Conference on Satellite Systems for Mobile Communications and Navigation*, IEE, pp. 147-153 (Oct. 17-19, 1988).

Akers, N.P. et al., "RF Sampling Gates: a Brief Review," *IEE Proceedings*, IEE, vol. 133, Part A, No. 1, pp. 45-49 (Jan. 1986).

Al-Ahmad, H.A.M. et al., "Doppler Frequency Correction for a Non-Geostationary Communications Satellite. Techniques for CERS and T-SAT," *Electronics Division Colloquium on Low Noise Oscillators and Synthesizers*, IEE, pp. 4/1-4/5 (Jan. 23, 1986).

Ali, I. et al., "Doppler Characterization for LEO Satellites," *IEEE Transactions on Communications*, IEEE, vol. 46, No. 3, pp. 309-313 (Mar. 1998).

Allan, D.W., "Statistics of Atomic Frequency Standards," *Proceedings Of The IEEE Special Issue on Frequency Stability*, IEEE, pp. 221-230 (Feb. 1966).

Allstot, D.J. et al., "MOS Switched Capacitor Ladder Filters," *IEEE Journal of Solid-State Circuits*, IEEE, vol. SC-13, No. 6, pp. 806-814 (Dec. 1978).

Allstot, D.J. and Black Jr. W.C., "Technological Design Considerations for Monolithic MOS Switched-Capacitor Filtering Systems," *Proceedings of the IEEE*, IEEE, vol. 71, No. 8, pp. 967-986 (Aug. 1983).

Alouini, M. et al., "Channel Characterization and Modeling for Ka-Band Very Small Aperture Terminals," *Proceedings Of the IEEE*, IEEE, vol. 85, No. 6, pp. 981-997 (Jun. 1997).

Audreyev, G.A. and Ogarev, S.A., "Phase Distortions of Keyed Millimeter-Wave Signals in the Case of Propagation in a Turbulent Atmosphere," *Telecommunications and Radio Engineering*, Scripta Technica, vol. 43, No. 12, pp. 87-90 (Dec. 1988).

Antonetti, A. et al., "Optoelectronic Sampling in the Picosecond Range," *Optics Communications*, North-Holland Publishing Company, vol. 21, No. 2, pp. 211-214 (May 1977).

Austin, J. et al., "Doppler Correction of the Telecommunication Payload Oscillators in the UK T-SAT," *18th European Microwave Conference*, Microwave Exhibitions and Publishers Ltd., pp. 851-857 (Sep. 12-15, 1988).

Auston, D.H., "Picosecond optoelectronic switching and gating in silicon," *Applied Physics Letters*, American Institute of Physics, vol. 26, No. 3, pp. 101-103 (Feb. 1, 1975).

Baher, H., "Transfer Functions for Switched-Capacitor and Wave Digital Filters," *IEEE Transactions on Circuits and Systems*, IEEE Circuits and Systems Society, vol. CAS-33, No. 11, pp. 1138-1142 (Nov. 1986).

Baines, R., "The DSP Bottleneck," *IEEE Communications Magazine*, IEEE Communications Society, pp. 46-54 (May 1995).

Banjo, O.P. and Vilar, E., "Binary Error Probabilities on Earth-Space Links Subjects to Scintillation Fading," *Electronics Letters*, IEE, vol. 21, No. 7, pp. 296-297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277-280 (Mar. 30-Apr. 2, 1987).

Banjo, O.P. and Vilar, E., "Measurement and Modeling of Amplitude Scintillations on Low-Elevation Earth-Space Paths and Impact on Communication Systems," *IEEE Transactions on Communications*, IEEE Communications Society, vol. COM-34, No. 8, pp. 774-780 (Aug. 1986).

Banjo, O.P. et al., "Tropospheric Amplitude Spectra Due to Absorption and Scattering in Earth-Space Paths," *Fourth International Conference on Antennas and Propagation (ICAP 85)*, IEE, pp. 77-82 (Apr. 16-19, 1985).

Basili,P. et al., "Case Study of Intense Scintillation Events on the OTS Path," *IEEE Transactions on Antennas and Propagation*, IEEE, vol. 38, No. 1, pp. 107-113 (Jan. 1990).

Basili, P. et al., "Observation of High $C^2$ and Turbulent Path Length on OTS Space-Earth Link," *Electronics Letters*, IEE, vol. 24, No. 17, pp. 1114-1116 (Aug. 18, 1988).

Blakey, J.R. et al., "Measurement of Atmospheric Millimetre-Wave Phase Scintillations in an Absorption Region," *Electronics Letters*, IEE, vol. 21, No. 11, pp. 486-487 (May 23, 1985).

Burgueño, A. et al., "Influence of rain gauge integration time on the rain rate statistics used in microwave communications," *annales des tèlècommunications*, International Union of Radio Science, pp. 522-527 (Sep./Oct. 1988).

Burgue ño, A. et al., "Long-Term Joint Statistical Analysis of Duration and Intensity of Rainfall Rate with Application to Microwave Communications," *Fifth International Conference on Antennas and Propagation (ICAP 87)*

Burgueño, A. et al., "Long Term Statistics of Precipitation Rate Return Periods in the Context of Microwave Communications," *Sixth International Conference on Antennas and Propagation (ICAP 89) Part 2: Propagation*, IEE, pp. 297-301 (Apr. 4-7, 1989).

Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359-1366 (Sep. 1990).

Catalan, C. and Vilar, E., "Approach for satellite slant path remote sensing," *Electronics Letters*, IEE, vol. 34, No. 12, pp. 1238-1240 (Jun. 11, 1998).

Chan, P. et al., "A Highly Linear 1-GHz CMOS Downconversion Mixer," *European Solid State Circuits Conference*, IEEE Communication Society, pp. 210-213 (Sep. 22-24, 1993).

Declaration of Michael J. Bultman filed in U.S. Appl. No. 09/176,022, which is directed to related subject matter, 2 pages.

Declaration of Robert W. Cook filed in U.S. Appl. No. 09/176,022, which is directed to related subject matter, 2 pages.

Declaration of Alex Holtz filed in U.S. Appl. No. 09/176,022, which is directed to related subject matter, 3 pages.

Declaration of Richard C. Looke filed in U.S. Appl. No. 09/176,022, which is directed to related subject matter, 2 pages.

Declaration of Charley D. Moses, Jr. filed in U.S. Appl. No. 09/176,022, which is directed to related subject matter, 2 pages.

Declaration of Jeffrey L. Parker and David F. Sorrells, with attachment Exhibit 1, filed in U.S. Appl. No. 09/176,022, which is directed to related subject matter, 130 pages.

Dewey, R.J. and Collier, C.J., "Multi-Mode Radio Receiver," *Electronics Division Colloquium on Digitally Implemented Radios*, IEE, pp. 3/1-3/5 (Oct. 18, 1985).

Dialog File 347 (JAPIO) English Language Patent Abstract for JP 2-276351, 1 page (Nov. 13, 1990—Date of publication of application).

Dialog File 347 (JAPIO) English Language Patent Abstract for JP 2-131629, 1 page (May 21, 1990—Date of publication of application).

Dialog File 347 (JAPIO) English Language Patent Abstract for JP 2-39632, 1 page (Feb. 8, 1990—Date of publication of application).

Dialog File 348 (European Patents) English Language Patent Abstract for EPO 0 785 635 A1, 3 pages (Dec. 26, 1996—Date of publication of application).

Dialog File 348 (European Patents) English Language Patent Abstract for EP 35166 A1, 2 pages (Feb. 18, 1981—Date of publication of application).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET-Less Sample-and-Hold with High Charge-to-Droop Current Ratio," *IEEE Journal of Solid-State Circuits*, IEEE, vol. SC-13, No. 6, pp. 864-873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol. IM-32, No. 1, pp. 208-213 (Mar. 1983).

Faulkner, N.D. et al., "Sub-Harmonic Sampling for the Accurate Measurement of Frequency Stability of Microwave Oscillators," *CPEM 82 Digest: Conference on Precision Electromagnetic Measurements*, IEEE, pp. M-10 and M-11 (1982).

Faulker, N.D. and Vilar, E., "Time Domain Analysis of Frequency Stability Using Non-Zero Dead-Time Counter Techniques," *CPEM 84 Digest Conference on Precision Electromagnetic Measurements*, IEEE, pp. 81-82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958-1965 (Nov. 1990).

Fukahori, K., "A CMOS Narrow-Band Signaling Filter with Q Reduction," *IEEE Journal of Solid-State Circuits*, IEEE, vol. SC-19, No. 6, pp. 926-932 (Dec. 1984).

Fukuchi, H. and Otsu, Y., "Available time statistics of rain attenuation on earth-space path," *IEE Proceedings-H: Microwaves, Antennas and Propagation*, IEE, vol. 135, Pt. H, No. 6, pp. 387-390 (Dec. 1988).

Gibbins, C.J. and Chadha, R., "Millimetre-wave propagation through hydrocarbon flame," *IEE Proceedings*, IEE, vol. 134, Pt. H, No. 2, pp. 169-173 (Apr. 1987).

Gilchrist, B. et al., "Sampling hikes performance of frequency synthesizers," *Microwaves & RF*, Hayden Publishing, vol. 23, No. 1, pp. 93-94 and 110 (Jan. 1984).

Gossard, E.E., "Clear weather meteorological effects on propagation at frequencies above 1 Ghz," *Radio Science*, American Geophysical Union, vol. 16, No. 5, pp. 589-608 (Sep.—Oct. 1981).

Gregorian, R. et al., "Switched-Capacitor Circuit Design," *Proceedings of the IEEE*, IEEE, vol. 71, No. 8, pp. 941-966 (Aug. 1983).

Groshong et al., "Undersampling Techniques Simplify Digital Radio," *Electronic Design*, Penton Publishing, pp. 67-68, 70, 73-75 and 78 (May 23, 1991).

Grove, W.M., "Sampling for Oscilloscopes and Other RF Systems: Dc through X-Band," *IEEE Transactions on Microwave Theory and Techniques*, IEEE, pp. 629-635 (Dec. 1966).

Haddon, J. et al., "Measurement of Microwave Scintillations on a Satellite Down-Link at X-Band," *Antennas and Propagation*, IEE, pp. 113-117 (1981).

Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP-34, No. 5, pp. 646-657 (May 1986).

Hafdallah, H. et al., "2-4 Ghz MESFET Sampling," *Electronics Letters*, IEE, vol. 24, No. 3, pp. 151-153 (Feb. 4, 1988).

Herben, M.H.A.J., "Amplitude and Phase Scintillation Measurements on 8-2 km Line-Of-Sight Path at 30 Ghz," *Electronics Letters*, IEE, vol. 18, No. 7, pp. 287-289 (Apr. 1, 1982).

Hewitt, A. et al., "An 18 Ghz Wideband LOS Multipath Experiment," *International Conference on Measurements for Telecommunications Transmission Systems—MTTS 85*, IEE, pp. 112-116 (Nov. 27-28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136-1143 (Nov. 1989).

Hewitt, A. and Vilar, E., "Selective fading on LOS Microwave Links: Classical and Spread-Spectrum Measurements Techniques," *IEEE Transactions on Communications*, IEEE Communications Society, vol. 36, No. 7, pp. 789-796 (Jul. 1988).

Hospitalier, E., "Instruments for Recording and Observing Rapidly Varying Phenomena," *Science Abstracts*, IEE, vol. VII, pp. 22-23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115-121 (Sep. 18-20, 1990).

Hu, X., *A Switched-Current Sample-and-Hold Amplifier for FM Demodulation*, Thesis for Master of Applied Science, Dept. of Electrical and Computer Engineering, University of Toronto, UMI Dissertation Services, pp. 1-64 (1995).

Hung, H-L. A. et al., "Characterization of Microwave Integrated Circuits Using An Optical Phase-Locking and Sampling System," *IEEE MTT-S Digest*, IEEE, pp. 507-510 (1991).

Hurst, P.J., "Shifting the Frequency Response of Switched-Capacitor Filters by Nonuniform Sampling," *IEEE Transactions on Circuits and Systems*, IEEE Circuits and Systems Society, vol. 38, No. 1, pp. 12-19 (Jan. 1991).

Itakura, T., "Effects of the sampling pulse width on the frequency characteristics of a sample-and-hold circuit," *IEE Proceedings Circuits, Devices and Systems*, IEE, vol. 141, No. 4, pp. 328-336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52-59 (Aug. 1950).

Janssen, J.M.L. and Michels, A.J., "An Experimental 'Stroboscopic' Oscilloscope for Frequencies up to about 50 Mc/s: II. Electrical Build-Up," *Philips Technical Review*, Philips Research Laboratories, vol. 12, No. 3, pp. 73-82 (Sep. 1950).

Jondral, V.F. et al., "Doppler Profiles for Communication Satellites," *Frequenz*, Herausberger, pp. 111-116 (May-Jun. 1996).

Kaleh, G.K., "A Frequency Diversity Spread Spectrum System for Communication in the Presence of In-band Interference," *1995 IEEE Globecom*, IEEE Communications Society, pp. 66-70 (1995).

Karasawa, Y. et al., "A New Prediction Method for Tropospheric Scintillation on Earth-Space Paths," *IEEE Transactions on Antennas and Propagation*, IEEE Antennas and Propagation Society, vol. 36, No. 11, pp. 1608-1614 (Nov. 1988).

Kirsten, J. and Fleming, J., "Undersampling reduces data-acquisition costs for select applications," *EDN*, Cahners Publishing, vol. 35, No. 13, pp. 217-222, 24, 226-228 (Jun. 21, 1990).

Lam, W.K. et al., "Measurement of the Phase Noise Characteristics of an Unlocked Communications Channel Identifier," *Proceedings Of the 1993 IEEE International Frequency Control Symposium*, IEEE, pp. 283-288 (Jun. 2-4, 1993).

Lam, W.K. et al., "Wideband sounding of 11.6 Ghz transhorizon channel," *Electronics Letters*, IEE, vol. 30, No. 9, pp. 738-739 (Apr. 28, 1994).

Larkin, K.G., "Efficient demodulator for bandpass sampled AM signals," *Electronics Letters*, IEE, vol. 32, No. 2, pp. 101-102 (Jan. 18, 1996).

Lau, W.H. et al., "Analysis of the Time Variant Stucture of Microwave Line-of-sight Multipath Phenomena," *IEEE Global Telecommunications Conference & Exhibition*, IEEE, pp. 1707-1711 (Nov. 28-Dec. 1, 1988).

Lau, W.H. et al., "Improved Prony Algorithm to Identify Multipath Components," *Electronics Letters*, IEE, vol. 23, No. 20, pp. 1059-1060 (Sep. 24, 1987).

Lesage, P. and Audoin, C., "Effect of Dead-Time on the Estimation of the Two-Sample Variance," *IEEE Transactions on Instrumentation and Measurement*, IEEE Instrumentation and Measurement Society, vol. IM-28, No. 1, pp. 6-10 (Mar. 1979).

Liechti, C.A., "Performance of Dual-gate GaAs MESFET's as Gain-Controlled Low-Noise Amplifiers and High-Speed Modulators," *IEEE Transactions on Microwave Theory and Techniques*, IEEE Microwave Theory and Techniques Society, vol. MTT-23, No. 6, pp. 461-469 (Jun. 1975).

Linnenbrink, T.E. et al., "A One Gigasample Per Second Transient Recorder," *IEEE Transactions on Nuclear Science*, IEEE Nuclear and Plasma Sciences Society, vol. NS-26, No. 4, pp. 4443-4449 (Aug. 1979).

Liou, M.L., "A Tutorial on Cumputer-Aided Analysis of Switched-Capacitor Circuits," *Proceedings of the IEEE*, IEEE, vol. 71, No. 8, pp. 987-1005 (Aug. 1983).

Lo, P. et al., "Coherent Automatic Gain Control," *IEE Colloquium on Phase Locked Techniques*, IEE, pp. 2/1-2/6 (Mar. 26, 1980).

Lo, P. et al., "Computation of Rain Induced Scintillations on Satellite Down-Links at Microwave Frequencies," *Third International Conference on Antennas and Propagation (ICAP83)*, pp. 127-131 (Apr. 12-15, 1983).

Lo, P.S.L.O. et al., "Observations of Amplitude Scintillations on a Low-Elevation Earth-Space Path," *Electronics Letters*, IEE, vol. 20, No. 7, pp. 307-308 (Mar. 29. 1984).

Madani, K. and Aithison, C.S., "A 20 Ghz Microwave Sampler," *IEEE Transactions on Microwave Theory and Techniques*, IEEE Microwave Theory and Techniques Society, vol. 40, No. 10, pp. 1960-1963 (Oct. 1992).

Marsland, R.A. et al., "130 Ghz GaAs monolithic integrated circuit sampling head," *Appl. Phys. Lett.*, American Institute of Physics, vol. 55, No. 6, pp. 592-594 (Aug. 7, 1989).

Martin, K. and Sedra, A.S., "Switched-Capacitor Building Blocks for Adaptive Systems," *IEEE Transactions on Circuits and Systems*, IEEE Circuits and Systems Society, vol. CAS-28, No. 6, pp. 576-584 (Jun. 1981).

Marzano, F.S. and d'Auria, G., "Model-based Prediction of Amplitude Scintillation variance due to Clear-Air Tropospheric Turbulence on Earth-Satellite Microwave Links," *IEEE Transactions on Antennas and Propagation*, IEEE Antennas and Propagation Society, vol. 46, No. 10, pp. 1506-1518 (Oct. 1998).

Matricciani, E., "Prediction of fade durations due to rain in satellite communications systems," *Radio Science*, American Geophysical Union, vol. 32, No. 3, pp. 935-941 (May-Jun. 1997).

McQueen, J.G., "The Monitoring of High-Speed Waveforms," *Electronic Engineering*, Morgan Brothers Limited, vol. XXIV, No. 296, pp. 436-441 (Oct. 1952).

Merkelo, J. and Hall, R.D., "Broad-Band Thin-Film Signal Sampler," *IEEE Journal of Solid-State Circuits*, IEEE, vol. SC-7, No. 1, pp. 50-54 (Feb. 1972).

Merlo, U. et al., "Amplitude Scintillation Cycles in a Sirio Satellite-Earth Link," *Electronics Letters*, IEE, vol. 21, No. 23, pp. 1094-1096 (Nov. 7, 1985).

Morris, D., "Radio-holographic reflector measurement of the 30-m millimeter radio telescope at 22 Ghz with a cosmic signal source," *Astronomy and Astrophysics*, Springer-Verlag, vol. 203, No. 2, pp. 399-406 (Sep. (II) 1988).

Moulsley, T.J. et al., "The efficient acquisition and processing of propagation statistics," *Journal of the Institution of Electronic and Radio Engineers*, IERE, vol. 55, No. 3, pp. 97-103 (Mar. 1985).

Ndzi, D. et al., "Wide-Band Statistical Characterization of an Over-the-Sea Experimental Transhorizon Link," *IEE Colloquium on Radio Communications at Microwave and Millimetre Wave Frequencies*, IEE, pp. 1/1-1/6 (Dec. 16, 1996).

Ndzi, D. et al., "Wideband Statistics of Signal Levels and Doppler Spread on an Over-The-Sea Transhorizon Link," *IEE Colloquium on Propagation Characteristics and Related System Techniques for Beyond Line-of-Sight Radio*, IEE, pp. 9/1-9/6 (Nov. 24, 1997).

"New zero IF chipset from Philips," *Electronic Engineering*, United News & Media, vol. 67, No. 825, p. 10 (Sep. 1995).

Ohara, H. et al., "First monolithic PCM filter cuts cost of telecomm systems," *Electronic Design*, Hayden Publishing Company, vol. 27, No. 8, pp. 130-135 (Apr. 12, 1979).

Oppenheim, A.V. et al., *Signals and Systems*, Prentice-Hall, pp. 527-531 and 561-562 (1983).

Ortgies, G., "Experimental Parameters Affecting Amplitude Scintillation Measurements on Satellite Links," *Electronics Letters*, IEE, vol. 21, No. 17, pp. 771-772 (Aug. 15, 1985).

Pärssinen et al., "A 2-GHz Subharmonic Sampler for Signal Downconversion," *IEEE Transactions on Microwave Theory and Techniques*, IEEE, vol. 45, No. 12, 7 pages (Dec. 1997).

Peeters, G. et al., "Evaluation of Statistical Models for Clear-Air Scintillation Prediction Using Olympus Satellite Measurements," *International Journal of Satellite Communications*, John Wiley and Sons, vol. 15, No. 2, pp. 73-88 (Mar.-Apr. 1997).

Perrey, A.G. and Schoenwetter, H.K., *NBS Technical Note 1121: A Schottky Diode Bridge Sampling Gate*, U.S. Dept. of Commerce, pp. 1-14 (May 1980).

Poulton, K. et al., "A 1-Ghz 6-bit ADC System," *IEEE Journal of Solid-State Circuits*, IEEE, vol. SC-22, No. 6, pp. 962-969 (Dec. 1987).

Press Release, "Parkervision, Inc. Announces Fiscal 1993 Results," Lippert/Heilshorn and Associates, 2 Pages (Apr. 6, 1994).

Press Release, "Parkervision, Inc. Announces the Appointment of Michael Baker to the New Position National Sales Manager," Lippert/Heilshorn and Associates, 1 Page (Apr. 7, 1994).

Press Release, "Parkervision's Cameraman Well-Received By Distance Learning Market," Lippert/Heilshorn and Associates, 2 Pages (Apr. 8, 1994).

Press Release, "Parkervision, Inc. Announces First Quarter Financial Results," Lippert/Heilshorn and Associates, 2 Pages (Apr. 26, 1994).

Press Release, "Parkervision, Inc. Announces The Retirement of William H. Fletcher, Chief Financial Officer," Lippert/Heilshorn and Associates, 1 Page (May 11, 1994).

Press Release, "Parkervision, Inc. Announces New Cameraman System II™ At Infocomm Trade Show," Lippert/Heilshorn and Associates, 3 Pages (Jun. 9, 1994).

Press Release, "Parkervision, Inc. Announces Appointments to its National Sales Force," Lippert/Heilshorn and Associates, 2 Pages (Jun. 17, 1994).

Press Release, "Parkervision, Inc. Announces Second Quarter and Six Months Financial Results," Lippert/Heilshorn and Associates, 3 Pages (Aug. 9, 1994).

Press Release, "Parkervision, Inc. Announces Third Quarter and Nine Months Financial Results," Lippert/Heilshorn and Associates, 3 Pages (Oct. 28, 1994).

Press Release, "Parkervision, Inc. Announces First Significant Dealer Sale of Its *Cameraman*® System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).

Press Release, "Parkervision, Inc. Announces Joint Product Developments With VTEL," Lippert/Heilshorn and Associates, 2 Pages (Mar. 21, 1995).

Press Release, "Parkervision, Inc. Announces First Quarter Financial Results," Lippert/Heilshorn and Associates, 3 Pages (Apr. 28, 1995).

Press Release, "Parkervision Wins Top 100 Product Districts' Choice Award," Parkervision Marketing and Manufacturing Headquaters, 1 Page (Jun. 29, 1995).

Press Release, "Parkervision National Sales Manager Next President of USDLA," Parkervision Marketing and Manufacturing Headquarters, 1 Page (Jul. 6, 1995).

Press Release, "Parkervision Granted New Patent," Parkervision Marketing and Manufacturing Headquarters, 1 Page (Jul. 21, 1995).

Press Release, "Parkervision, Inc. Announces Second Quarter and Six Months Financial Results," Parkervision Marketing and Manufacturing Headquarters, 2 Pages (Jul. 31, 1995).

Press Release, "Parkervision, Inc. Expands Its Cameraman System II Product Line," Parkervision Marketing and Manufacturing Headquarters, 2 Pages (Sep. 22, 1995).

Press Release, "Parkervision Announces New Camera Control Technology," Parkervision Marketing and Manufacturing Headquarters, 2 Pages (Oct. 25, 1995).

Press Release, "Parkervision, Inc. Announces Completion of VTEL/Parkervision Joint Product Line," Parkervision Marketing and Manufacturing Headquaters, 2 Pages (Oct. 30, 1995).

Press Release, "Parkervision, Inc. Announces Third Quarter an Nine Months Financial Results," Parkervision Marketing and Manufacturing Headquarters, 2 Pages (Oct. 30, 1995).

Press Release, "Parkervision's Cameraman Personal Locator Camera System Wins Telecon XV Award," Parkervision Marketing and Manufacturing Headquarters, 2 Pages (Nov. 1, 1995).

Press Release, "Parkervision, Inc. Announces Purchase Commitment From VTEL Corporation," Parkervision Marketing and Manufacturing Headquarters, 1 Page (Feb. 26, 1996).

Press Release, "ParkerVision, Inc. Announces Fourth Quarter and Year End Results," Parkervision Marketing and Manufacturing Headquarters, 2 Pages (Feb. 27, 1996).

Press Release, "ParkerVision, Inc. Expands its Product Line," Parkervision Marketing and Manufacturing Headquaters, 2 Pages (Mar. 7, 1996).

Press Release, "ParkerVision Files Patents for its Research of Wireless Technology," Parkervision Marketing and Manufacturing Headquarters, 1 Page (Mar. 28, 1996).

Press Release, "Parkervision, Inc. Announces First Significant Sale of Its Cameraman® Three-Chip System," Parkervision Marketing and Manufacturing Headquarters, 2 pages (Apr. 12, 1996).

Press Release, "Parkervision, Inc. Introduces New Product Line For Studio Production Market," Parkervision Marketing and Manufacturing Headquarters, 2 Pages (Apr. 15, 1996).

Press Release, "Parkervision, Inc. Announces Private Placement of 800,000 Shares," Parkervision Marketing and Manufacturing Headquarters, 1 Page (Apr. 15, 1996).

Press Release, "Parkervision, Inc. Announces First Quarter Financial Results," Parkervision Marketing and Manufacturing Headquarters, 3 Pages (Apr. 30, 1996).

Press Release, "ParkerVision's New Studio Product Wins Award," Parkervision Marketing and Manufacturing Headquarters, 2 Pages (Jun. 5, 1996).

Press Release, "Parkervision, Inc. Announces Second Quarter and Six Months Financial Results," Parkervision Marketing and Manufacturing Headquarters, 3 Pages (Aug. 1, 1996).

Press Release, "Parkervision, Inc. Announces Third Quarter and Nine Months Financial Results," Parkervision Marketing and Manufacturing Headquarters, 2 Pages (Oct. 29, 1996).

Press Release, "PictureTel and ParkerVision Sign Reseller Agreement," Parkervision Marketing and Manufacturing Headquarters, 2 Pages (Oct. 30, 1996).

Press Release, "CLI and ParkerVision Bring Enhanced Ease-of-Use to Videoconferencing," CLI/Parkervision, 2 Pages (Jan. 20, 1997).

Press Release, "Parkervision, Inc. Announces Fourth Quarter and Year End Results," Parkervision Marketing and Manufacturing Headquarters, 3 Pages (Feb. 27, 1997).

Press Release, "Parkervision, Inc. Announces First Quarter Financial Results," Parkervision Marketing and Manufacturing Headquarters, 3 Pages (Apr. 29, 1997).

Press Release, "NEC and Parkervision Make Distance Learning Closer," NEC America, 2 Pages (Jun. 18, 1997).

Press Release, "Parkervision Supplies JPL with Robotic Cameras, Cameraman Shot Director for Mars Mission," Parkervision Marketing and Manufacturing Headquarters, 2 pages (Jul. 8, 1997).

Press Release, "ParkerVision and IBM Join Forces to Create Wireless Computer Peripherals," Parkervision Marketing and Manufacturing Headquarters, 2 Pages (Jul. 23, 1997).

Press Release, "Parkervision, Inc. Announces Second Quarter and Six Months Financial Results," Parkervision Marketing and Manufacturing Headquarters, 3 Pages (Jul. 31, 1997).

Press Release, "Parkervision, Inc. Announces Private Placement of 990,000 Shares," Parkervision Marketing and Manufacturing Headquarters, 2 Pages (Sep. 8, 1997).

Press Release, "Wal-Mart Chooses Parkervision for Broadcast Production," Parkervision Marketing and Manufacturing Headquarters, 2 Pages (Oct. 24, 1997).

Press Release, "Parkervision, Inc. Announces Third Quarter Financial Results," Parkervision Marketing and Manufacturing Headquarters, 3 Pages (Oct. 30, 1997).

Press Release, "ParkerVision Announces Breakthrough in Wireless Radio Frequency Technology," Parkvision Marketing and Manufacturing Headquarters, 3 Pages (Dec. 10, 1997).

Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).

Press Release, "Parkervision Announces Existing Agreement with IBM Terminates—Company Continues with Strategic Focus Announced in Dec.," Parkervision Marketing and Manufacturing Headquarters, 2 Pages (Jan. 27, 1998).

Press Release, "Laboratory Tests Verify Parkervision Wireless Technology," Parkervision Marketing and Manufacturing Headquarters, 2 Pages (Mar. 3, 1998).

Press Release, "Parkervision, Inc. Announces Fourth Quarter and Year End Financial Results," Parkervision Marketing and Manufacturing Headquarters, 3 Pages (Mar. 5, 1998).

Press Release, "Parkervision Awarded Editors' Pick of Show for NAB 98," Parkervision Marketing and Manufacturing Headquarters, 2 Pages (Apr. 15, 1998).

Press Release, "Parkervision Announces First Quarter Financial Results," Parkervision Marketing and Manufacturing Headquarters, 3 Pages (May 4, 1998).

Press Release, "Parkervision 'DIRECT2DATA' Introduced in Response to Market Demand," Parkervision Marketing and Manufacturing Headquarters, 3 Pages (Jul. 9, 1998).

Press Release, "Parkervision Expands Senior Management Team," Parkervision Marketing and Manufacturing Headquarters, 2 Pages (Jul. 29, 1998).

Press Release, "Parkervision Announces Second Quarter and Six Month Financial Results," Parkervision Marketing and Manufacturing Headquarters, 4 Pages (Jul. 30, 1998).

Press Release, "Parkervision Announces Third Quarter and Nine Month Financial Results," Parkervision Marketing and Manufacturing Headquarters, 3 Pages (Oct. 30, 1998).

Press Release, "Questar Infocomm, Inc. Invests $5 Million in Parkervision Common Stock," Parkervision Marketing and Manufacturing Headquarters, 2 Pages (Dec. 2, 1998).

Press Release, "Parkervision Adds Two New Directors," Parkervision Marketing and Manufacturing Headquarters, 2 Pages (Mar. 5, 1999).

Press Release, "Parkervision Announces Fourth Quarter and Year End Financial Results," Parkervision Marketing and Manufacturing Headquarters, 3 Pages (Mar. 5, 1999).

Press Release, "Joint Marketing Agreemen Offers New Automated Production Solution," Parkervision Marketing and Manufacturing Headquarters, 2 Pages (Apr. 13, 1999).

"Project COST 205: Scintillations in Earth-satellite links," *Alta Frequenza: Scientific Review in Electronics*, AEI, vol. LIV, No. 3, pp. 209-211 (May-Jun. 1985).

Razavi, B., *RF Microelectronics*, Prentice-Hall, pp. 147-149 (1998).

Reeves, R.J.D., "The Recording and Collocation of Waveforms (Part 1)," *Electronic Engineering*, Morgan Brothers Limited, vol. 31, No. 373, pp. 130-137 (Mar. 1959).

Reeves, R.J.D., "The Recording and Collocation of Waveforms (Part 2)," *Electronic Engineering*, Morgan Brothers Limited, vol. 31 No. 374, pp. 204-212 (Apr. 1959).

Rein, H.M. and Zahn, M., "Subnanosecond-Pulse Generator with Variable Pulsewidth Using Avalanche Transistors," *Electronics Letters*, IEE, vol. 11, No. 1, pp. 21-23 (Jan. 9, 1975).

Riad, S.M. and Nahman, N.S., "Modeling of the Feedthrough Wideband (DC to 12.4 Ghz) Sampling-Head," *IEEE MTT-S International Microwave Symposium Digest*, IEEE, pp. 267-269 (Jun. 27-29, 1978).

Rizzoli, V. et al., "Computer-Aided Noise Analysis of MESFET and HEMT Mixers," *IEEE Transactions on Microwave Theory and Techniques*, IEEE, vol. 37, No. 9, pp. 1401-1410 (Sep. 1989).

Rowe, H.E., *Signals and Noise in Communication Systems*, D. Van Nostrand Company, Inc., Princeton, New Jersey, including, for example, Chapter V, Pulse Modulation Systems (1965).

Rücker, F. and Dintelmann, F., "Effect of Antenna Size on OTS Signal Scintillations and Their Seasonal Dependence," *Electronics Letters*, IEE, vol. 19, No. 24, pp. 1032-1034 (Nov. 24, 1983).

Russell, R. and Hoare, L., "Millimeter Wave Phase Locked Oscillators," *Military Microwaves '78 Conference Proceedings*, Microwave Exhibitions and Publishers, pp. 238-242 (Oct. 25-27, 1978).

Sabel, L.P., "A DSP Implementation of a Robust Flexible Receiver/Demultiplexer for Broadcast Data Satellite Communications," *The Institution of Engineers Australia Communications Conference*, Institution of Engineers, Australia, pp. 218-223 (Oct. 16-18, 1990).

Salous, S., "IF digital generation of FMCW waveforms for wideband channel characterization," *IEE Proceedings-I*, IEE, vol. 139, No. 3, pp. 281-288 (Jun. 1992).

"Sampling Loops Lock Sources to 23 Ghz," *Microwaves & RF*, Penton Publishing, p. 212 (Sep. 1990).

Sasikumar, M. et al., "Active Compensation in the Switched-Capacitor Biquad," *Proceedings of the IEEE*, IEEE, vol. 71, No. 8, pp. 1008-1009 (Aug. 1983).

Saul, P.H., "A GaAs MESFET Sample and Hold Switch," *Fifth European Solid State Circuits Conference- ESSCIRC 79*, IEE, pp. 5-7 (1979).

Shen, D.H. et al., "A 900-MHZ RF Front-End with Integrated Discrete-Time Filtering," *IEEE Journal of Solid-State Circuits*, IEEE Solid-State Circuits Council, vol. 31, No. 12, pp. 1945-1954 (Dec. 1996).

Shen, X.D. and Vilar, E., "Anomalous transhorizon propagation and meteorological processes of a multilink path," *Radio Science*, American Geophysical Union, vol. 30, No. 5, pp. 1467-1479 (Sep.-Oct. 1995).

Shen, X. and Tawfik, A.N., "Dynamic Behaviour of Radio Channels Due to Trans-Horizon Propagation Mechanisms," *Electronics Letters*, IEE, vol. 29, No. 17, pp. 1582-1583 (Aug. 19, 1993).

Shen, X. et al., "Modeling Enhanced Spherical Diffraction and Troposcattering on a Transhorizon Path with aid of the parabolic Equation and Ray Tracing Methods," *IEE Colloquium on Common modeling techniques for electromagnetic wave and acoustic wave propagation*, IEE, pp. 4/1-4/7 (Mar. 8, 1996).

Shen, X. and Vilar, E., "Path loss statistics and mechanisms of transhorizon propagation over a sea path," *Electronics Letters*, IEE, vol. 32, No. 3, pp. 259-261 (Feb. 1, 1996).

Shen, D. et al., "A 900 MHZ Integrated Discrete-Time Filtering RF Front-End," *IEEE International Solid State Circuits Conference*, IEEE, vol. 39, pp. 54-55 and 417 (Feb. 1996).

Spillard, C. et al., "X-Band Tropospheric Transhorizon Propagation Under Differing Meteorological Conditions," *Sixth International Conference on Antennas and Propagation (ICAP 89) Part 2: Propagation*, IEE, pp. 451-455 (Apr. 4-7, 1989).

Stafford, K.R. et al., "A Complete Monolithic Sample/Hold Amplifier," *IEEE Journal of Solid-State Circuits*, IEEE, vol. SC-9, No. 6, pp. 381-387 (Dec. 1974).

Staruk, W. Jr. et al., "Pushing HF Data Rates," *Defense Electronics*, EW Communications, vol. 17, No. 5, pp. 211, 213, 215, 217, 220 and 222 (May 1985).

Stephenson, A.G., "Digitizing multiple RF signals requires an optimum sampling rate," *Electronics*, McGraw-Hill, pp. 106-110 (Mar. 27, 1972).

Sugarman, R., "Sampling Oscilloscope for Statistically Varying Pulses," *The Review of Scientific Instruments*, American Institute of Physics, vol. 28, No. 11, pp. 933-938 (Nov. 1957).

Sylvain, M., "Experiemental probing of multipath microwave channels," *Radio Science*, American Geophysical Union, vol. 24, No. 2, pp. 160-178 (Mar. Apr. 1989).

Takano, T., "NOVEL GaAs Pet Phase Detector Operable To Ka Band," *IEEE MT-S Digest*, IEEE, pp. 381-383 (1984).

Tan, M.A., "Biquadratic Transconductance Switched-Capacitor Filters," *IEEE Transactions on Circuits and Systems-I: Fundamental Theory and Applications*, IEEE Circuits and Systems Society, vol. 40, No. 4, pp. 272-275 (Apr. 1993).

Tanaka, K. et al., "Single Chip Multisystem AM Stereo Decoder IC," *IEEE Transactions on Consumer Electronics*, IEEE Consumer Electronics Society, vol. CE-32, No. 3, pp. 482-496 (Aug. 1986).

Tawfik, A.N., "Amplitude, Duration and Predictability of Long Hop Trans-Horizon X-band Signals Over the Sea," *Electronics Letters*, IEE, vol. 28, No. 6, pp. 571-572 (Mar. 12, 1992).

Tawfik, A.N. and Vilar, E., "Correlation of Transhorizon Signal Level Strength with Localized Surface Meteorological Parameters," *Eighth International Conference on Antennas and Propagation*, Electronics Division of the IEE, pp. 335-339 (Mar. 30- Apr. 2, 1993).

Tawfik, A.N. and Vilar, E., "Dynamci Structure of a Transhorizon Signal at X-band Over a Sea Path," *Sixth International Conference on Antennas and Propagation (ICAP 89) Part 2: Propagation*, IEE, pp. 446-460 (Apr. 4-7, 1989).

Tawfik, A.N. and Vilar, E., "Statistics of Duration and Intensity of Path Loss in a Microwave Transhorizon Sea-Path," *Electronics Letters*, IEE, vol. 26, No. 7, pp. 474-476 (Mar. 29, 1990).

Tawfik, A.N. and Vilar, E., "X-Band Transhorizon Measurements of CW Transmissions Over the Sea-Part 1: Path Loss, Duration of Events, and Their Modeling," *IEEE Transactions on Antennas and Propagation*, IEEE Antennas and Propagation Society, vol. 41, No. 11, pp. 1491-1500 (Nov. 1993).

Temes, G.C. and Tsividis, T., "The Special Section on Switched-Capacitor Circuits," *Proceedings of the IEEE*, IEEE, vol. 71, No. 8, pp. 915-916 (Aug. 1983).

Thomas, G.B., *Calculus and Analytic Geometry*, Third Edition, Addison-Wesley Publishing, pp. 119-133 (1960).

Tomassetti, Q., "An Unusual Microwave Mixer," *16th European Microwave Conference*, Microwave Exhibitions and Publishers, pp. 754-759 (Sep. 8-12, 1986).

Tortoli, P. et al., "Bidirectional Doppler Signal Analysis Based on a Single RF Sampling Channel," *IEEE Transactions on Ultrasonics, Ferroelectrics, and Frequency Control*, IEEE Ultrasonics, Ferroelectrics, and Frequency Control Society, vol. 41, No. 1, pp. 1-3 (Jan. 1984).

Tsividis, Y. and Antognetti, P. (Ed.), *Design of MOS VLSI Circuits for Telecommunications*, Prentice-Hall, p. 304 (1985).

Tsividis, Y., "Principles of Operation and Analysis of Switched-Capacitor Circuits," *Proceedings of the IEEE*, IEEE, vol. 71, No. 8, pp. 926-940 (Aug. 1983).

Tsurumi, H. and Maeda, T., "Design Study on a Direct Conversion Receiver Front-End for 280 MHZ, 900 MHZ, and 2.6 Ghz Band Radio Communication Systems," *41st IEEE Vehicular Technology Conference*, IEEE Vehicular Technology Society, pp. 457-462 (May 19-22, 1991).

Valdmanis, J.A. et al., "Picosecond and Subpicosend Optoelectronics for Measurements of Future High Speed Electronic Devices," *IEDM Technical Digest*, IEEE, pp. 597-600 (Dec. 5-7, 1983).

van de Kamp, M.M.J.L., "Asymmetric signal level distribution due to tropospheric scintillation," *Electronics Letters*, IEE, vol. 34, No. 11, pp. 1145-1146 (May 28, 1998).

Vasseur, H. and Vanhoenacker, D., "Characterization of tropospheric turbulent layers from radiosonde data," *Electronics Letters*, IEE, vol. 34, No. 4, pp. 318-319 (Feb. 19, 1998).

Verdone, R., "Outage Probability Analysis for Short-Range Communication Systems at 60 Ghz in ATT Urban Environments," *IEEE Transactions on Vehicular Technology*, IEEE Vehicular Technology Society, vol. 46, No. 4, pp. 1027-1039 (Nov. 1997).

Vierira-Ribeiro, S.A., *Single-IF DECT Receiver Architecture using a Quadrature Sub-Sampling Band-Pass Sigma-Delta Modulator*, Thesis for Degree of Master's of Engineering, Carleton University, UMI Dissertation Services, pp. 1-180 (Apr. 1995).

Vilar, E. et al., "A Comprehensive/Selective MM-Wave Satellite Downlink Experiment on Fade Dynamics," *Tenth International Conference on Antennas and Propagation*, Electronics Division of the IEE, pp. 2.98-2.101 (Apr. 14-17, 1997).

Vilar, E. et al., "A System to Measure LOS Atmospheric Transmittance at 19 Ghz," *AGARD Conference Proceedings No. 346: Characteristics of the Lower Atmosphere Influencing Radio Wave Propagation*, AGARD, pp. 8-1-8-16 (Oct. 4-7, 1983).

Vilar, E. and Smith, H., "A Theoretical and Experimental Study of Angular Scintillations in Earth Space Paths," *IEEE Transactions on Antennas and Propagation*, IEEE, vol. AP-34, No. 1, pp. 2-10 (Jan. 1986).

Vilar, E. et al., "A Wide Band Transhorizon Experiment at 11.6 Ghz," *Eighth International Conference on Antennas and Propagation*, Electronics Division of the IEE, pp. 441-445 (Mar. 30- Apr. 2, 1993).

Vilar, E. and Matthews, P.A., "Amplitude Dependence of Frequency in Oscillators," *Electronics Letters*, IEE, vol. 8, No. 20, pp. 509-511 (Oct. 5, 1972).

Vilar, E. et al., "An experimental mm-wave receiver system for measuring phase noise due to atmospheric turbulence,"

*Proceedings of the 25th European Microwave Conference*, Nexus House, pp. 114-119 (1995).

Vilar, E. and Burgueño, A., "Analysis and Modeling of Time Intervals Between Rain Rate Exceedances in the Context of Fade Dynamics," *IEEE Transactions on Communications*, IEEE Communications Society, vol. 39, No. 9, pp. 1306-1312 (Sep. 1991).

Vilar, E. et al., "Angle of Arrival Fluctuations in High and Low Elevation Earth Space Paths," *Fourth International Conference on Antennas and Propagation (ICAP 85)*, Electronics Division of the IEE, pp. 83-88 (Apr. 16-19, 1985).

Vilar, E., "Antennas and Propagation: A Telecommunications Systems Subject," *Electronics Division Colloquium on Teaching Antennas and Propagation to Undergraduates*, IEE, pp. 7/1-7/6 (Mar. 8, 1988).

Vilar, E. et al., "CERS*. Millimetre-Wave Beacon Package and Related Payload Doppler Correction Strategies," *Electronics Division Colloquium on CERS- Communications Engineering Research Satellite*, IEE, pp. 10/1-10/10 (Apr. 10, 1984).

Vilar, E. and Moulsley, T.J., "Comment and Reply: Probabillty Density Function of Amplitude Scintillations," *Electronics Letters*, IEE, vol. 21, No. 14, pp. 620-622 (Jul. 4, 1985).

Vilar, E. et al., "Comparison of Rainfall Rate Duration Distributions for ILE-IFE and Barcelona," *Electronics Letters*, IEE, vol. 28, No. 20, pp. 1922-1924 (Sep. 24, 1992).

Vilar, E., "Depolarization and Field Transmittances in Indoor Communications," *Electronics Letters*, IEE, vol. 27, No. 9, pp. 732-733 (Apr. 25, 1991).

Vilar, E. and Larsen, J.R., "Elevation Dependence of Amplitude Scintillations on Low Elevation Earth Space Paths," *Sixth International Conference on Antennas and Propagation (ICAP 89) Part 2: Propagation*, IEE, pp. 150-154 (Apr. 4-7, 1989).

Vilar, E. et al., "Experimental System and Measurements of Transhorizon Signal Levels at 11 Ghz," *18th European Microwave Conference*, Microwave Exhibitions and Publishers Ltd., pp. 429-435 (Sep. 12-15, 1988).

Vilar, E. and Matthews, P.A., "Importance of Amplitude Scintillations in Millimetric Radio Links," *Proceedings of the 4th European Microwave Conference*, Microwave Exhibitions and Publishers, pp. 202-206 (Sep. 10-13, 1974).

Vilar, E. and Haddon, J., "Measurement and Modeling of Scintillation Intensity to Estimate Turbulence Parameters in an Earth-Space Path," *IEEE Transactions on Antennas and Propagation*, IEEE Antennas and Propagation Society, vol. AP-32, No. 4, pp. 340-346 (Apr. 1984).

Vilar, E. and Matthews, P.A., "Measurement of Phase Fluctuations on Millimetric Radiowave Propagation," *Electronics Letters*, IEE, vol. 7, No. 18, pp. 566-568 (Sep. 9, 1971).

Vilar, E. and Wan, K.W., "Narrow and Wide Band Estimates of Fields Strength for Indoor Communications in the Millimetre Band," *Electronics Division Colloquium on Radiocommunications in the Range 30-60 Ghz*, IEE, pp. 5/1-5/8 (Jan. 17, 1991).

Vilar, E. and Faulkner, N.D., "Phase Noise and Frequency Stability Measurements. Numerical Techniques and Limitations," *Electronics Division Colloquium on Low Noise Oscillators and Synthesizer*, IEE, 5 pages (Jan. 23, 1986).

Vilar, E. and Senin, S., "Propagation phase noise identified using 40 Ghz satellite downlink," *Electronics Letters*, IEE, vol. 33, No. 22, pp. 1901-1902 (Oct. 23, 1997).

Vilar, E. et al., "Scattering and Extinction: Dependence Upon Raindrop Size Distribution in Temperate (Barcelona) and Tropical (Belem) Regions," *Tenth International Conference on Antennas and Propagation*, Electronics Division of the IEE, pp. 2.230-2.233 (Apr. 14-17, 1997).

Vilar, E. and Haddon, J., "Scintillation Modeling and Measurement—A Tool for Remote-Sensing Slant Paths," *AGARD Conference Proceedings No. 332: Propagation Aspects of Frequency Sharing, Interference And System Diversity*, AGARD, pp. 27-1-27-13 (Oct. 18-22, 1982).

Vilar, E., "Some Limitations on Digital Transmission Through Turbulent Atmosphere," *International Conference on Satellite Communication Systems Technology*, Electronics Division of the IEE, pp. 169-187 (Apr. 7-10, 1975).

Vilar, E. and Matthews, P.A., "Summary of Scintillation Observations in a 36 Ghz Link Across London," *International Conference on Antennas and Propagation Part 2: Propagation*, IEE, pp. 36-40 (Nov. 28-30, 1978).

Vilar, E. et al., "Wideband Characterization of Scattering Channels," *Tenth International Conference on Antennas and Propagation*, Electronics Division of the IEE, pp. 2.353-2.358 (Apr. 14-17, 1997).

Vollmer, A., "Complete GPS Receiver Fits on Two Chips," *Electronic Design*, Penton Publishing, pp. 50, 52, 54 and 56 (Jul. 6, 1998).

*Voltage and Time Resolution in Digitizing Oscilloscopes: Application Note 348*, Hewlett Packard, pp. 1-11 (Nov. 1986).

Wan, K.W. et al., "A Novel Approach to the Simultaneous Measurement of Phase and Amplitude Noises in Oscillator," *Proceedings of the 19th European Microwave Conference*, Microwave Exhibitions and Publishers Ltd., pp. 809-813 (Sep. 4-7, 1989).

Wan, K.W. et al., "Extended Variances and Autoregressive/Moving Average Algorithm for the Measurement and Synthesis of Oscillator Phase Noise," *Proceedings Of the 43rd Annual Symposium on Frequency Control*, IEEE, pp. 331-335 (1989).

Wan, K.W. et al., "Wideband Transhorizon Channel Sounder at 11 Ghz," *Electronics Division Colloquium on High Bit Rate UHF/SHF Channel Sounders—Technology and Measurement*, IEE, pp. 3/1-3/5 (Dec. 3, 1993).

Wang, H., "A 1-V Multigigahertz RF Mixer Core in 0.5—µm CMOS," *IEEE Journal of Solid-State Circuits*, IEEE Solid-State Circuits Society, vol. 33, No. 12, pp. 2265-2267 (Dec. 1998).

Watson, A.W.D. et al., "Digital Conversion and Signal Processing for High Performance Communications Receivers," *Digital Processing of Signals in Communications*, Institution of Electronic and Radio Engineers, pp. 367-373 (Apr. 22nd-26th, 1985).

Weast, R.C. et al. (Ed.), *Handbook of Mathematical Tables*, Second Edition, The Chemical Rubber Co. pp. 480-485 (1964).

Wiley, R.G., "Approximate FM Demodulation Using Zero Crossings," *IEEE Transactions on Communications*, IEEE, vol. COM-29, No.7, pp. 1061-1065 (Jul. 1981).

Worthman, W., "Convergence . . . Again," *RF Design*, Primedia, p. 102 (Mar. 1999).

Young, I.A. and Hodges, D.A., "MOS Switched-Capacitor Analog Sampled-Data Direct-Form Recursive Filters," *IEEE Journal of Solid-State Circuits*, IEEE, vol. SC-14, No. 6, pp. 1020-1033 (Dec. 1979).

Translation of Specification and Claims of FR Patent No. 2245130, 3 pages.

Fest, Jean-Pierre, "Le Convertisseur A/N Revolutionne Le Recepteur Radio," *Electronique*, JMJ (Publisher), No. 54, pp. 40-42 (Dec. 1995).

Translation of DE Patent No. 35 41 031 A1, 22 pages.

Translations of EP Patent No. 0 732 803 A1, 9 pages.

Fest, Jean-Pierre, "The A/D Converter Revolutionizes the Radio Receiver," *Electronique*, JMJ (Publisher), No. 54, 3 pages (Dec. 1995). (Translation of Doc. AQ50).

Translation of German Patent No. DE 197 35 798 C1, 8 pages.

Miki, S. and Nagahama, R., *Modulation System II*, Common Edition 7, Kyoritsu Publishing Co., Ltd., pp. 146-154 (Apr. 30, 1956).

Miki, S. and Nagahama, R., *Modulation System II*, Common Edition 7, Kyoritsu Publishing Co., Ltd., pp. 146-149 (Apr. 30, 1956). (Partial Translation of Doc. AQ51).

Rabiner, L.R. and Gold, B., *Theory And Application Of Digital Signal Processing*, Prentice-Hall, Inc., pp. v-xii and 40-46 (1975).

English-language Abstract of Japanese Patent Publication No. 08-032556, from http://www1.ipdl.jpo.go.jp, 2 Pages (Feb. 2, 1996—Date of publication of application).

English-language Abstract of Japanese Patent Publication No. 08-139524, from http://www1.ipdl.jpo.go.jp, 2 Pages (May 31, 1996—Date of publication of application).

English-language Abstract of Japanese Patent Publication No. 59-144249, from http://www1.ipdl.jpo.go.jp, 2 Pages (Aug. 18, 1984—Date of publication of application).

English-language Abstract of Japanese Patent Publication No. 63-054002, from http://www1.ipdl.jpo.go.jp, 2 Pages (Mar. 8, 1988—Date of publication of application).

English-language Abstract of Japanese Patent Publication No. 06-237276, from http://www1.ipdl.jpo.go.jp, 2 Pages (Aug. 23, 1994—Date of publication of application).

English-language Abstract of Japanese Patent Publication No. 08-023359, from http://www1.ipdl.jpo.go.jp, 2 Pages (Jan. 23, 1996—Date of publication of application).

Translation of Japanese Patent Publication No. 47-2314, 7 pages.

Partial Translation of Japanese Patent Publication No. 58-7903, 3 pages.

English-language Abstract of Japanese Patent Publication No. 58-133004, from http://www1.ipdl.jpo.go.jp, 2 Pages (Aug. 8, 1983—Date of publication of application).

English-language Abstract of Japanese Patent Publication No. 60-058705, from http://www1.ipdl.jpo.go.jp, 2 Pages (Apr. 4, 1985—Date of publication of application).

English-language Abstract of Japanese Patent Publication No. 04-123614, from http://www1.ipdl.jpo.go.jp, 2 Pages (Apr. 23, 1992—Date of publication of application).

English-language Abstract of Japanese Patent Publication No. 04-127601, from http://www1.ipdl.jpo.go.jp, 2 Pages (Apr. 28, 1992—Date of publication of application).

English-language Abstract of Japanese Patent Publication No. 05-175730, from http://www1.ipdl.jpo.go.jp, 2 Pages (Jul. 13, 1993—Date of publication of application).

English-language Abstract of Japanese Patent Publication No. 05-175734, from http://www1.ipdl.jpo.go.jp, 2 Pages (Jul. 13, 1993—Date of publication of application).

English-language Abstract of Japanese Patent Publication No. 07-154344, from http://www1.ipdl.jpo.go.jp, 2 Pages (Jun. 16, 1995—Date of publication of application).

English-language Abstract of Japanese Patent Publication No. 07-307620, from http://www1.ipdl.jpo.go.jp, 2 Pages (Nov. 21, 1995—Date of publication of application).

Oppenheim, A.V. and Schafer, R.W., *Digital Signal Processing*, Prentice-Hall, pp. vii-x, 6-35, 45-78, 87-121 and 136-165 (1975).

English-language Abstract of Japanese Patent Publication No. 55-066057, from http://www1.ipdl.jpo.go.jp, 1 Page (May 19, 1980—Date of publication of application).

English-language Abstract of Japanese Patent Publication No. 63-065587, from http://www1.ipdl.jpo.go.jp, 1 Page (Mar. 24, 1988—Date of publication of application).

English-language Abstract of Japanese Patent Publication No. 63-153691, from http://www1.ipdl.jpo.go.jp, 1 Page (Jun. 27, 1988—Date of publication of application).

Translation of Japanese Patent Publication No. 60-130203, 3, pages.

Razavi, B., "A 900-MHz/1.8-Ghz CMOS Transmitter for Dual-Band Applications," *Symposium on VLSI Circuits Digest of Technical Papers*, IEEE, pp. 128-131 (1998).

Ritter, G.M., "SDA, A New Solution for Transceivers," *16th European Microwave Conference*, Microwave Exhibitions and Publishers, pp. 729-733 (Sep. 8, 1986).

DIALOG File 351 (Derwent WPI) English Language Patent Abstract for FR 2 669 787, 1 page (May 29, 1992- Date of publication of application).

Akos, D.M. et al., "Direct Bandpass Sampling of Multiple Distinct RF Signals," *IEEE Transactions on Communications*, IEEE, vol. 47, No. 7, pp. 983-988 (Jul. 1999).

Patel, M. et al., "Bandpass Sampling for Software Radio Receivers, and the Effect of Oversampling on Aperture Jitter," *VTC 2002*, IEEE, pp. 1901-1905 (2002).

English-language Abstract of Japanese Patent Publication No. 61-030821, from http://www1.ipdl.jpo.go.jp, 1 Page (Feb. 13, 1986- Date of publication of application).

English-language Abstract of Japanese Patent Publication No. 05-327356, from http://www1.ipdl.jpo.go.jp, 1 Page (Dec. 10, 1993—Date of publication of application).

Tayloe, D., "A Low-noise, High-performance Zero IF Quadrature Detector/Preamplifier," *RF Design*, Primedia Business Magazines & Media, Inc., pp. 58, 60, 62 and 69 (Mar. 2003).

Dines, J.A.B., "Smart Pixel Optoelectronic Receiver Based on a Charge Sensitive Amplifier Design," *IEEE Journal of Selected Topics in Quantum Electronics*, IEEE, vol. 2, No. 1, pp. 117-120 (Apr. 1996).

Simoni, A. et al., "A Digital Camera for Machine Vision," *20th International Conference on Industrial Electronics, Control and Instrumentation*, IEEE, pp. 879-883 (Sep. 1994).

Stewart, R.W. and Pfann, E., "Oversampling and sigma-delta strategies for data conversion," *Electronics & Communication Engineering Journal*, IEEE, pp. 37-47 (Feb. 1998).

Rudell, J.C. et al., "A 1.9-Ghz Wide-Band IF Double Conversion CMOS Receiver for Cordless Telephone Applications," *IEEE Journal of Solid-State Circuits*, IEEE, vol. 32, No. 12, pp. 2071-2088 (Dec. 1997).

English-language Abstract of Japanese Patent Publication No. 09-036664, from http://www1.ipdl.jpo.go.jp, 2 Pages (Feb. 7, 1997—Date of publication of application).

Simoni, A. et al., "A Single-Chip Optical Sensor with Analog Memory for Motion Detection," *IEEE Journal of Solid-State Circuits*, IEEE, vol. 30, No. 7, pp. 800-806 (Jul. 1995).

English Translation of German Patent Publication No. DE 196 48 915 A1, 10 pages.

Deboo, Gordon J., *Integrated Circuits and Semiconductor Devices*, 2nd Edition, McGraw-Hill, Inc., pp. 41-45 (1977).

English-language Abstract of Japanese Patent Publication No. JP 61-232706, data supplied by the espacenet, (Oct. 17, 1986—Date of publication of application).

English-language Abstract of Japanese Patent Publication No. JP 9-171399, data supplied by the espacenet, (Jun. 30, 1997—Date of publication of application).

English-language Abstract of Japanese Patent Publication No. JP 10-41860, data supplied by the espacenet, (Feb. 13, 1998—Date of publication of application).

English-language Computer Translation of Japanese Patent Publication No. JP 10-173563, provided by the JPO, 10 pages (Jun. 26, 1998 - Date of publication of application) and cited in U.S. Appl. No. 10/305,299, directed to related subject matter.

*What is I/Q Data?*, printed Sep. 16, 2006, from http://zone.ni.com, 8 pages (Copyright 2003).

\* cited by examiner $$C_{k,m-1} = \begin{bmatrix} C_{0,0} & C_{0,1} & \cdots & C_{0,m-1} \\ C_{1,0} & & & \\ C_{2,0} & & & \\ \vdots & & & \\ C_{k,0} & & & C_{k,m-1} \end{bmatrix}$$

PSK FAST HADAMARD TRANSFORM

—CONTINUED ON FIG.7B—

METHOD AND APPARATUS FOR A PARALLEL CORRELATOR AND APPLICATIONS THEREOF

CROSS-REFERENCE TO RELATED APPLICATIONS

This application is a continuation of U.S. application Ser. No. 09/987,193, filed Nov. 13, 2001, entitled "Method and Apparatus for a Parallel Correlator and Applications Thereof," now U.S. Pat. No. 7,010,559, which claims the benefit of U.S. provisional application, "Method and Apparatus for a Parallel Correlator and Applications Thereof," Ser. No. 60/248,001, filed Nov. 14, 2000, each of which is incorporated herein by reference in its entirety.

The following application of common assignee is related to the present application, and is herein incorporated by reference in its entirety: U.S. non-provisional application, "Method and System for Down-Converting an Electromagnetic Signal, Transforms for Same, and Aperture Relationships," Ser. No. 09/550,644, filed Apr. 14, 2000.

BACKGROUND OF THE INVENTION

1. Field of the Invention

The present invention relates to matched filters and correlators and, more particularly, to a novel fast correlator transform ("FCT") and to methods and systems for implementing same.

2. Related Art

Matched Filter Theory was introduced by D. O. North in 1943. Others such as Van Vleck, Middleton, Weiner, and Turin, have added to the body of knowledge and application, ranging from RADAR to SONAR and communications. Although the basic theory was originally applied to continuous time systems and linear networks, the theory has been augmented to absorb discrete sampled filters and correlator operations. Indeed Paul Green pointed out in the June 1960 IRE Transactions on Information Theory, Matched Filter Issue:

"Correlation detection was studied at first as a separate subject, but the equivalence of the two operations (meaning matched filters and correlators) was soon appreciated."

IRE Transactions on Information Theory, New York, N.Y.: Professional Group on Information, Institute of Radio Engineers, June, 1960, incorporated herein by reference in its entirety.

More recently Van Whalen and Blahut as well as others have provided proofs of mathematical equivalence of correlation or matched filtering based on a change of variables formulation.

With the surge of DSP and proliferation of VLSI CMOS circuits as well as the universal push for software radios, many discrete matched filter realizations have evolved. The most notable digital implementation is the Transversal or Finite Impulse Response Filter which may realize the time flipped impulse response of the waveform to be processed or utilized as a correlator, both which produce the equivalent result at the optimum observation instant.

A particular concern arises when multiple filtering operations are required, concurrently, as is the case for parallel correlators. The complexity, clock speeds and signal flow control typically increase cost, size, and power.

What are needed are improved methods and systems for performing matched filtering and/or correlating functions, including concurrent and/or parallel correlations.

SUMMARY OF THE INVENTION

The present invention is directed to methods and systems for performing matched filtering and/or correlating functions, including concurrent and/or parallel correlations. More particularly, the present invention is directed to a fast correlator transform (FCT) algorithm and methods and systems for implementing same. The invention is uesful for, among other things, correlating an encoded data word $(X_0-X_{M-1})$ with encoding coefficients $(C_0-C_{M-1})$, wherein each of $(X_0-X_{M-1})$ is represented by one or more bits and each coefficient is represented by one or more bits, wherein each coefficient has k possible states, and wherein M is greater than 1.

In accordance with the invention, $X_0$ is multiplied by each state $(C_{0(0)}$ through $C_{0(k-1)})$ of the coefficient $C_0$, thereby generating results $X_0C_{0(0)}$ through $X_0C_{0(k-1)}$. This is repeating for data bits $(X_1-X_{M-1})$ and corresponding coefficients $(C_1-C_{M-1})$, respectively. The results are grouped into N groups combinations within each of said N groups are added to one another, thereby generating a first layer of correlation results.

The first layer of results is grouped and the members of each group are summed with one another to generate a second layer of results. This process is repeated as necessary until a final layer of results is generated. The final layer of results includes a separate correlation output for each possible state of the complete set of coefficients $(C_0-C_{M-1})$. The results in the final layer are compared with one another to identify a most likely code encoded on said data word.

In an embodiment, the summations are pruned to exclude summations that would result in invalid combinations of the encoding coefficients $(C_0-C_{M-1})$. In an embodiment, substantially the same hardware is utilized for processing in-phase and quadrature phase components of the data word $(X_0-X_{M-1})$. In an embodiment, the coefficients $(C_0-C_{M-1})$ represent real numbers. In an alternative embodiment, the coefficients $(C_0-C_{M-1})$ represent complex numbers. In an embodiment, the coefficients $(C_0-C_{M-1})$ are represented with a single bit. Alternatively, the coefficients $(C_0-C_{M-1})$ are represented with multiple bits (e.g., magnitude). In an embodiment, the coefficients $(C_0-C_{M-1})$ represent a cyclic code keying ("CCK") code set substantially in accordance with IEEE 802.11 WLAN standard.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein. The drawing in which an element first appears is typically indicated by the leftmost digit(s) in the corresponding reference number.

BRIEF DESCRIPTION OF THE DRAWINGS/FIGURES

The present invention will be described with reference to the accompanying drawings wherein.

DETAILED DESCRIPTION OF THE INVENTION

TABLE OF CONTENTS

I. Introduction
II. Example Environment: 802.11
III. Fast Correlator Transform and Correlator Kernels
IV. Mathematical Formulation
V. Comparisons to the Hadamard Transform
VI. Maximum Likelihood Decoding (AWGN, no Multipath)
   A. Magnitude Comparator
VII. Example Methods for Implementing the FCT Algorithm
VIII. CCK Chip Code Words

IX CONCLUSION

I. Introduction

Figure 1:
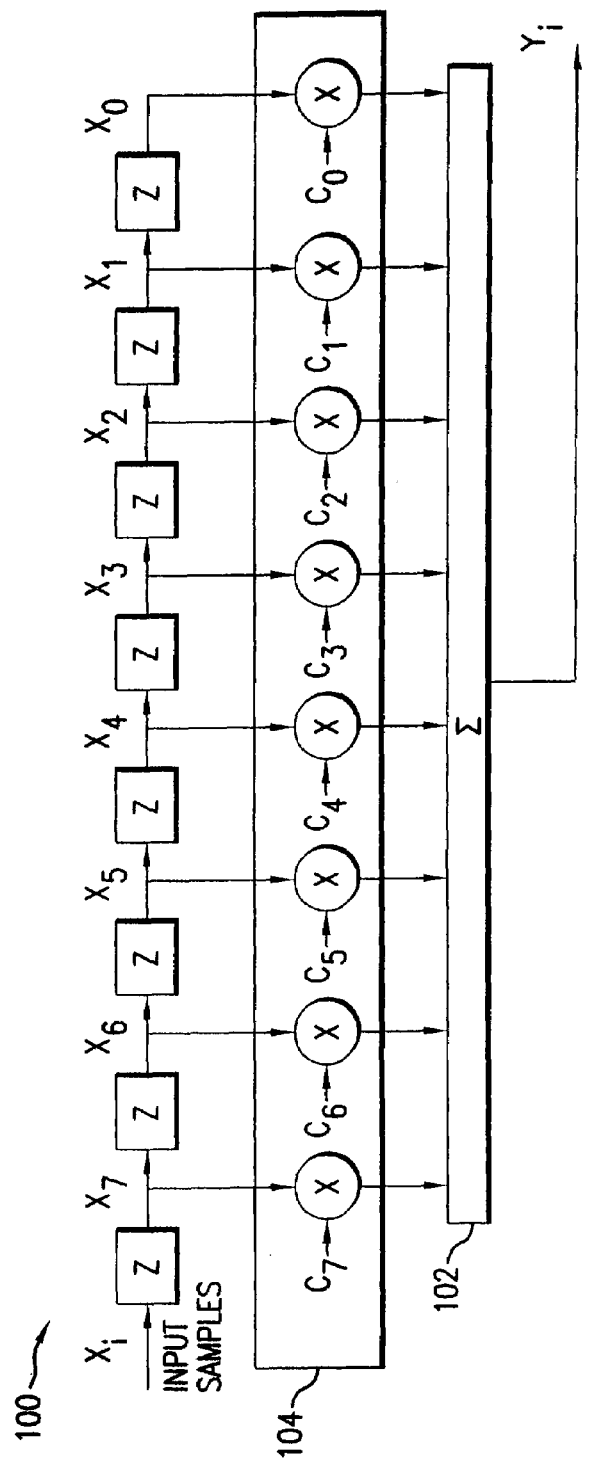
FIG. 1 is a block diagram of an example discrete transversal matched filter or correlator, in which the present invention can be implemented.

FIG. 1 is a block diagram of an example discrete transversal matched filter or correlator 100, also referred to herein as a finite impulse response ("FIR") filter 100. The FIR filter 100 includes a set of multipliers 104 that multiply data words $X_i$ by coefficients C. The FIR filter 100 also includes a final accumulate or summation function 102. The matched filter 100 implements the following discrete sampling equation;

$$y_i = \sum_{k=0}^{n-1} c_k x_{(i-k)} \quad \text{(Eq. 1)}$$

In Eq. 1, $X_i$ are typically derived from a sampling device such as an A/D converter and can be represented as signed magnitude, two's complement, or other binary representation in parallel bit format. Likewise the multiplier tap coefficients $C_0 \ldots C_n$ can be 1 bit values or k bit (soft) values depending on the application. In the case of soft value implementations, the multiplier functions can represent considerable hardware or algorithmic complexity. The final summation can be implemented using discrete adder technologies or floating point processors. The entire architecture can be implemented in hardware, software, or a hybrid of each.

A particular concern arises when multiple filtering operations are required, concurrently, as is the case for parallel correlators. The complexity, clock speeds and signal flow control typically increase cost, size, and power. Hence, efficient architectures are often pursued to streamline the implementation and thereby differentiate product offerings.

The present invention is directed to a novel fast correlator transform ("FCT") algorithm that reduces the number of additions for parallel correlation, as compared to conventional techniques. The present invention is also directed to methods and systems for implementing the novel FCT algorithm. Conventional techniques are typically of less universal application and restricted to certain signaling schemes. The present invention, on the other hand, is applicable to a variety of parallel matched filter and/or correlator operations.

The present invention is as efficient or more efficient than the Fast Walsh Transform, currently applied as the "state of the art," and is more universally applicable to signaling schemes employing higher order signaling spaces such as MQAM, CDMA, etc. In addition, classical multi-path processor algorithms are more easily applied using the classical correlator/matched filter kernel, in accordance with the present invention, rather than the conventional modified Fast Walsh Transform.

II. Example Environment: 802.11

The present invention is described herein as implemented in an example environment of an IEEE 802.11b 11 MBPS physical layer signaling scheme. IEEE 802.11 is a well-known communications standard and is described in, for example, "Medium Access Control (MAC) and Physical (PHY) Specifications," ANS/IEEE Std 802.11, published by IEEE, (1999Ed.), and incorporated herein by reference in its entirety.

The present invention is not, however, limited to the IEEE 802.11 communications standard. Based on the description herein, one skilled in the relevant art(s) will understand that the present invention can be implemented for a variety of other applications as well. Such other applications are within the spirit and scope of the present invention.

The 802.11 signaling scheme of interest is based on Cyclic Code Keying ("CCK") derived from Walsh/Hadamard functions. A restricted set within the available coding space was selected so that the Fast Walsh Transform could be utilized to implement an efficient correlator architecture. Originally, both Harris and Lucent could not figure out how to apply a classical parallel matched filter or correlator, efficiently, to process the waveforms. The current coding space provides for 64 code words. Harris erroneously predicted that a classical parallel matched filter approach would require 8×64=512 complex additions since each code word is 8 bits, on I and Q and there are 64 code words. However, the true estimate is 7×64=448 complex additions as illustrated in the example 8-way adder tree illustrated in FIG. 2.

Figure 2:
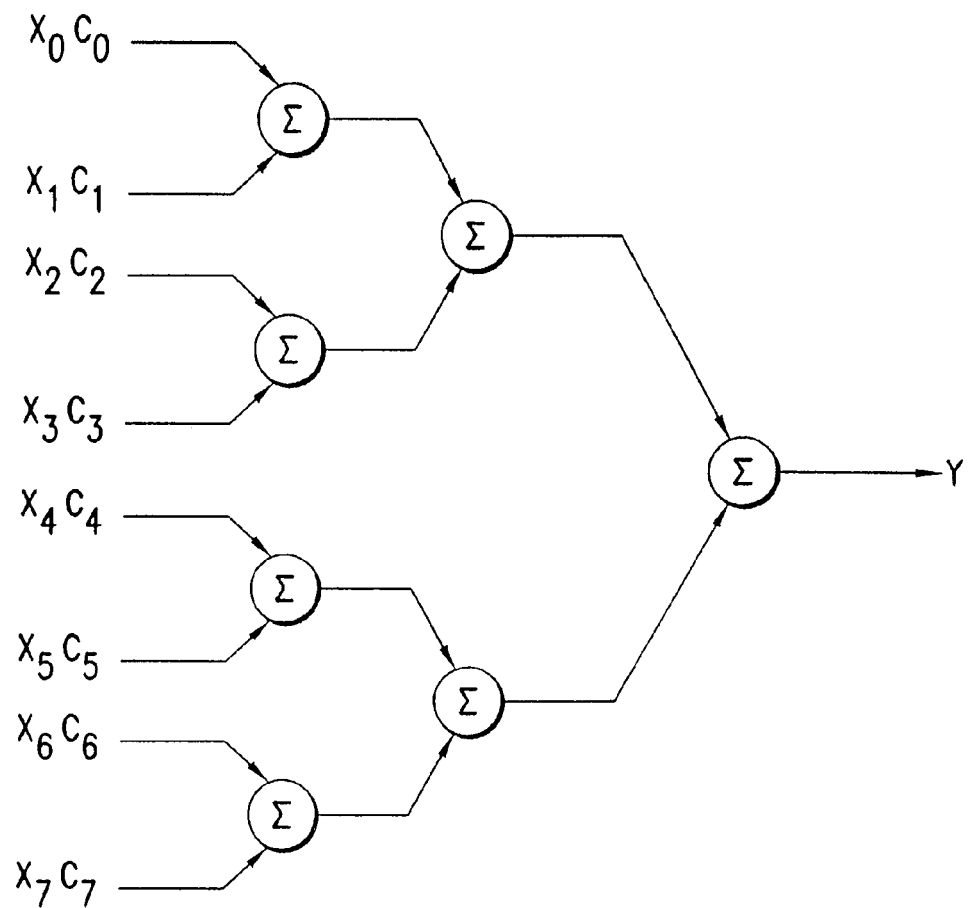
FIG. 2 is an expanded view of the summation function illustrated in FIG. 1.

FIG. 2 is an expanded view of the final accumulate or summation function 102 in FIG. 1, part of the FIR filter 100. Notice that only 7 adders are required for the example implementation. Nevertheless, 448 complex additions represent a significant number of operations. Lucent, Harris/Intersil, and Alantro apply the Fast Walsh Transform ("FWT") to the CCK code set to reduce the correlation operation down to 112 complex multiplies due to the restriction placed on the code set.

The FWT is actually more of a decoder than a correlator. It reduces to the performance of a correlator for this specific application if the coefficients in the butterfly branches are weighted with simple hard coded values, i.e., 1,−1, j, −j. The imaginary numbers are included for the case of complex signaling.

The FCT algorithm, according to the present invention, is truly a correlation or matched filter operation and can be applied with soft value weighting or hard value weighting. Furthermore, the present invention is intuitively satisfying, possessing direct correspondence of matched filter tap weights or coefficients maintained throughout the hierarchical structure. This permits easy extension of the matched filter concept to accommodate channel equalization, MLSE, and other adaptive applications.

III. Fast Correlator Transform and Correlator Kernels

The available coding space for a 16 bit word is $2^{16}$=65536. CCK whittles this space down to a code set formed by 8 in-phase ("I") chip and 8 quadrature phase ("Q") chip complex symbols. 64 code words are retained, carrying 6 bits of information. 2 more bits are contained in the complex QPSK representation, for a total of 8 bits of information.

Suppose then that 8 samples of an input vector $X_0$, $X_1$, ... $X_7$ are associated with optimal sampling instants from the output of a chip matched filter. Each of these samples would normally be weighted by the coefficients $C_0$ ... $C_7$ then assimilated as illustrated in FIGS. 1 and 2.

In the 802.11 example, $C_0$ ... $C_7$ correspond to samples of the CCK code set symbols. The unknowns $X_0$ ... $X_7$ are noisy input samples from which a specific code must be extracted. Conceptually, 64 such complex filtering operations should be performed concurrently since a specific code word cannot be predicted a priori. The largest output from the parallel bank of correlators would then be selected as the most likely code word correlation match at that particularly symbol sample time.

In accordance with the present invention, a general philosophy for correlation is imposed for partitioned segments of code words. In an embodiment, the code word correlations are divided into sub-sets. In the illustrated example embodiment, the code word correlations are divided into sample pairs. The present invention is not, however, limited to this example embodiment. In other embodiments, the code word correlations are divided into triplets, quintuplets, and/or any other suitable sub-sets.

Figure 3A:
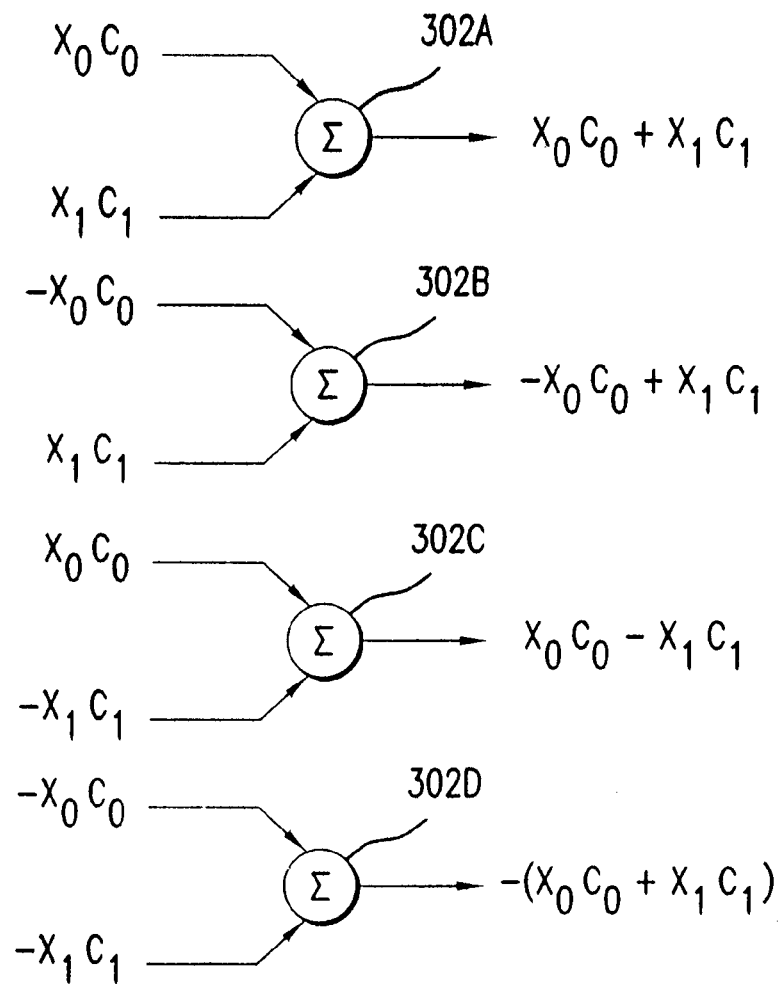
FIG. 3A illustrates example correlation kernels, in accordance with an aspect of the present invention.

Combinations of the code word correlation sub-sets are then provided to correlation kernels. FIG. 3A illustrates example correlation kernels 302a–302d, in accordance with an aspect of the present invention.

The correlation kernels 302a–302d represent all or substantially all possible correlation options for the first 2 samples $X_0$, $X_1$. In a similar fashion the remaining groupings of double samples $(X_2, X_3)$, $(X_4, X_5)$, $(X_6, X_7)$ will also spawn their own set of 4 correlation kernels.

The number of separate correlation kernels spawned is determined by the number of correlated samples per summation, the number of correlation variations possible, and, in an embodiment, the number of invalid combinations of correlated samples. In the present example, each coefficient has two possible states (i.e., hard value weighting). Thus each subset correlation generates 4 outputs. In alternative embodiments, soft weighting is implemented, where each coefficient is represented with multiple bits (e.g., magnitude representation).

In an embodiment, binary antipodal signaling in accordance with the present invention is implemented in accordance with Eq. 2.

$$N_k = \frac{n!}{r!(n-r)!} - L \qquad \text{(Eq. 2)}$$

The result for the example environment described above, using 2 input summers, is shown in Eq. 3:

$$N_k = \frac{4!}{2!(2)!} - 2 \qquad \text{(Eq. 3)}$$

wherein:
n is the number of uniquely available summer inputs;
r is the number of summing inputs per kernel; and
L is the number of invalid combinations.

$N_k$ is thus the number of correlation kernels and therefore the number of adders or summers required. Groupings of two correlation samples provide for convenient binary expansion. As stated above, however, the present invention is not limited to groupings of two.

The term L represents the number of invalid or disallowed combinations. For instance, $X_0C_0$ and $-X_0C_0$ is an invalid combination when added and therefore can be subtracted from the total number of combinations. In an embodiment, 3 way adders or summers are utilized. In other embodiments, other algorithmic partitioning is utilized. For the current example, partitioning in powers of 2 is convenient and attractive in terms of potential hardware implementation.

Figure 3B:
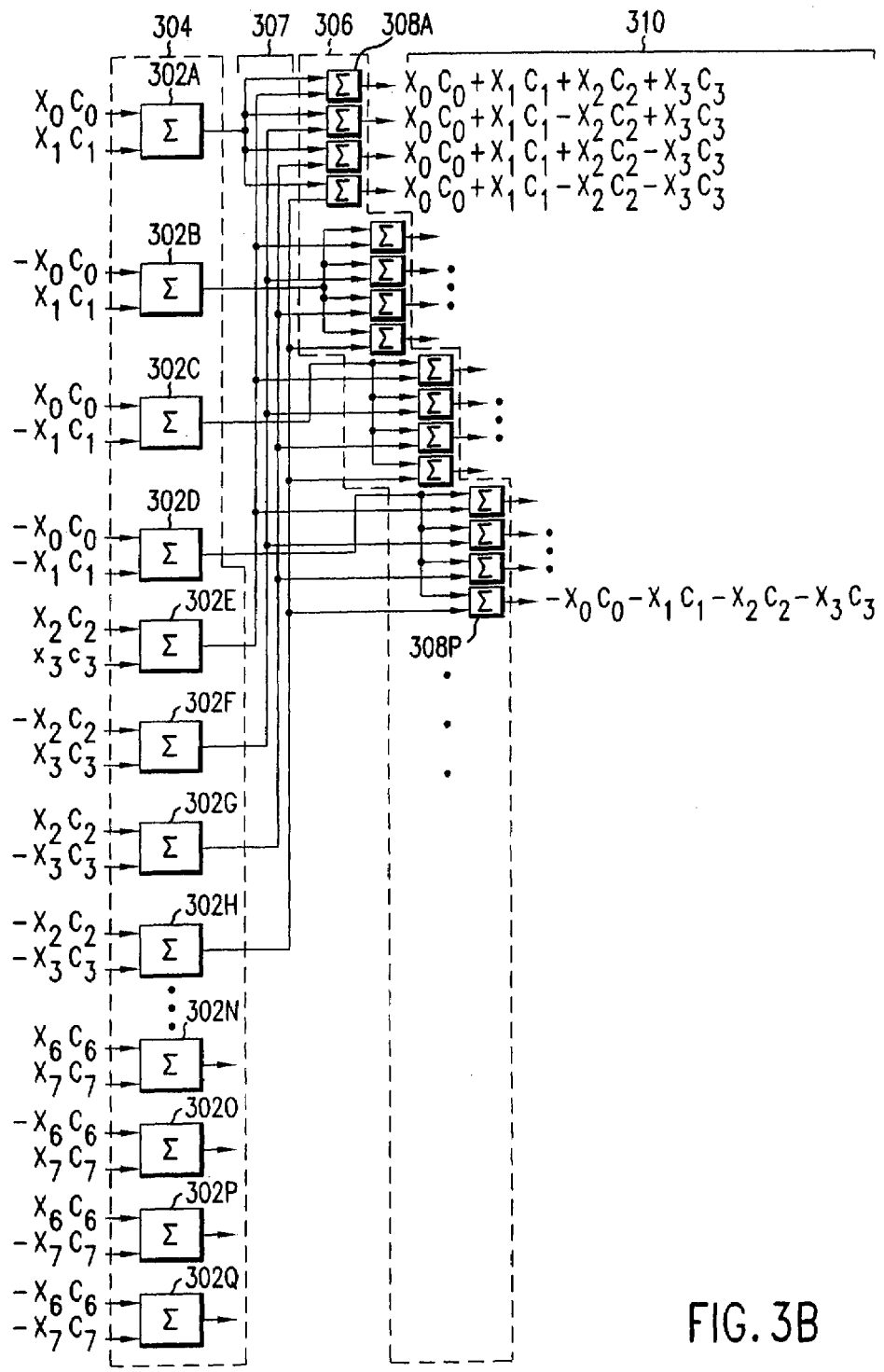
FIG. 3B illustrates example first and second layers of an FCT processing hierarchy in accordance with an aspect of the invention.

FIG. 3B illustrates example first and second layers 304 and 306, respectively, of an FCT processing hierarchy in accordance with an aspect of the invention.

The second layer 306 includes 32 additions 308, of which 308a through 308p are illustrated, to process combinations of correlations from the first layer 304 of correlation kernels. The first layer 304 includes 16 additions related to the first 4 sample correlations $X_0C_0$ ... $X_3C_3$, and 16 additions related to the $2^{nd}$ 4 sample correlations. Hence, the first layer 304 of kernels includes 16 adders 302 and the second layer possesses 32 adders 308. Once the second layer 306 is accomplished, each term that results includes 4 correlation components.

Note that 4 unique samples $X_0$ ... $X_3$ at the system input spawns $2^4$ unique 4-tuple correlations at the second layer 306 of kernel processing. The corresponding number of additions is calculated for the 4 sample correlation sequences from Eq. 4:

$$N = \frac{8!}{2!6!} - 2\left(\frac{4!}{2!2!}\right) = 16 \qquad \text{(Eq. 4)}$$

Figure 7A:
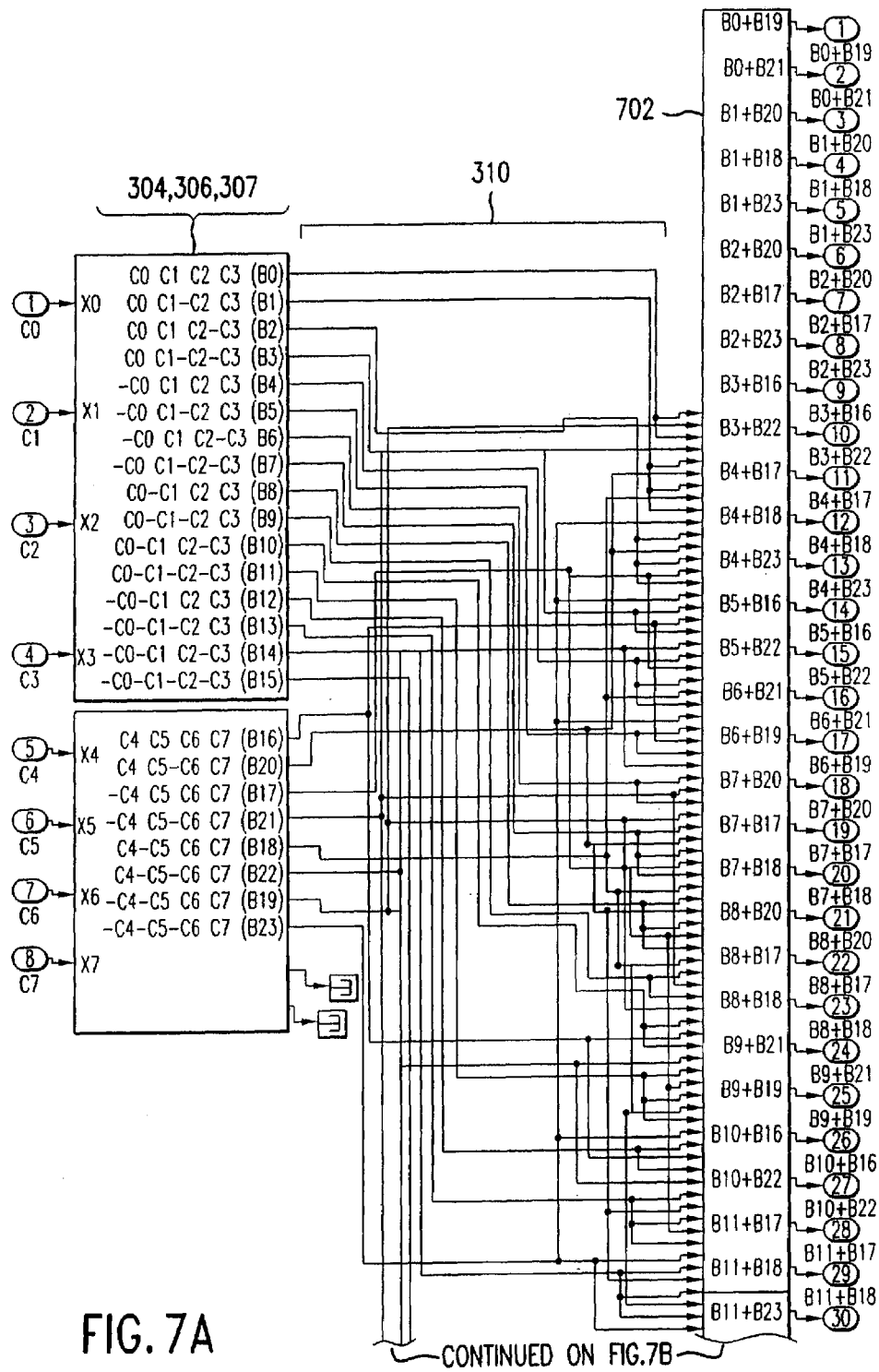
FIG. 7 illustrates an example final layer of an FCT processing hierarchy in accordance with an aspect of the invention.
Figure 7B:
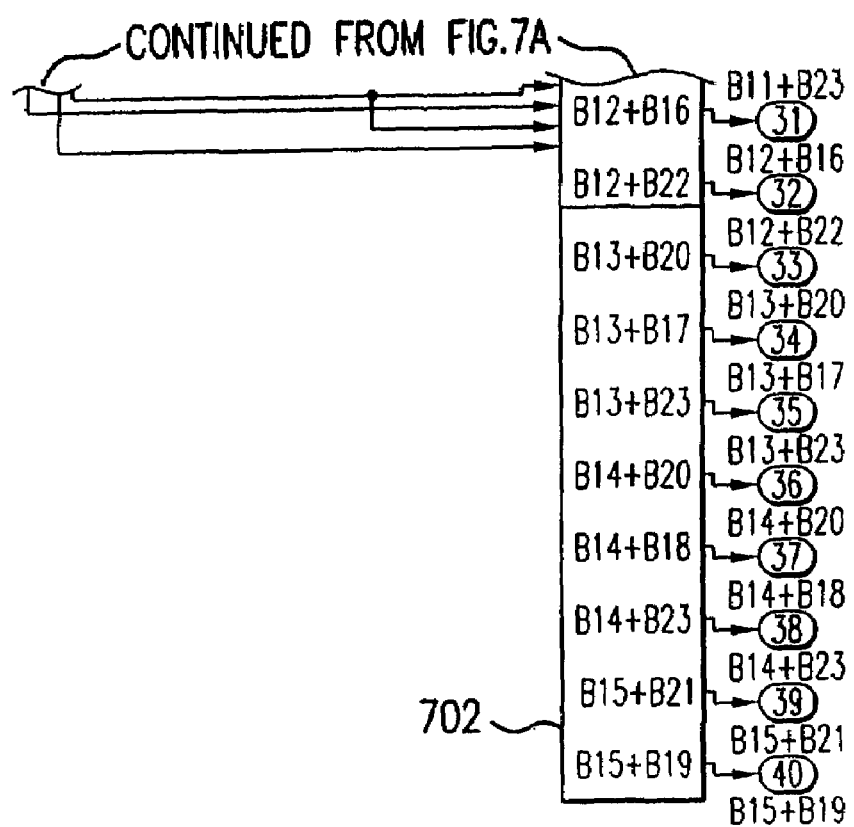

At this point it is important to realize that all that is required is one more level of processing to obtain correlation terms consisting of 8 components which represents a full length correlation. However, it must also be recognized that there are 16 upper 4-tuple correlations as well as 16 lower 4-tuple correlations, which if exploited for all combinations in this case would yield 256 addition operations! Fortunately the CCK code set is well defined and possesses only 64 valid 8 chip component correlations. Hence, the final layer, illustrated in FIG. 7, is pruned to perform only 64 unique addition operations. Thus, a total (upper bound) number of adders used for the algorithm are:

16 (first hierarchical layer)+32 (second layer)+64 (third layer)=112

This is a remarkable result because a conventional parallel matched filter or correlator bank would require 448 complex additions. Theoretically, 112 is the upper bound. However, in practice, the Trellis may be pruned to a maximum of 78 additions on the I and 78 and the Q.

Figure 3C:
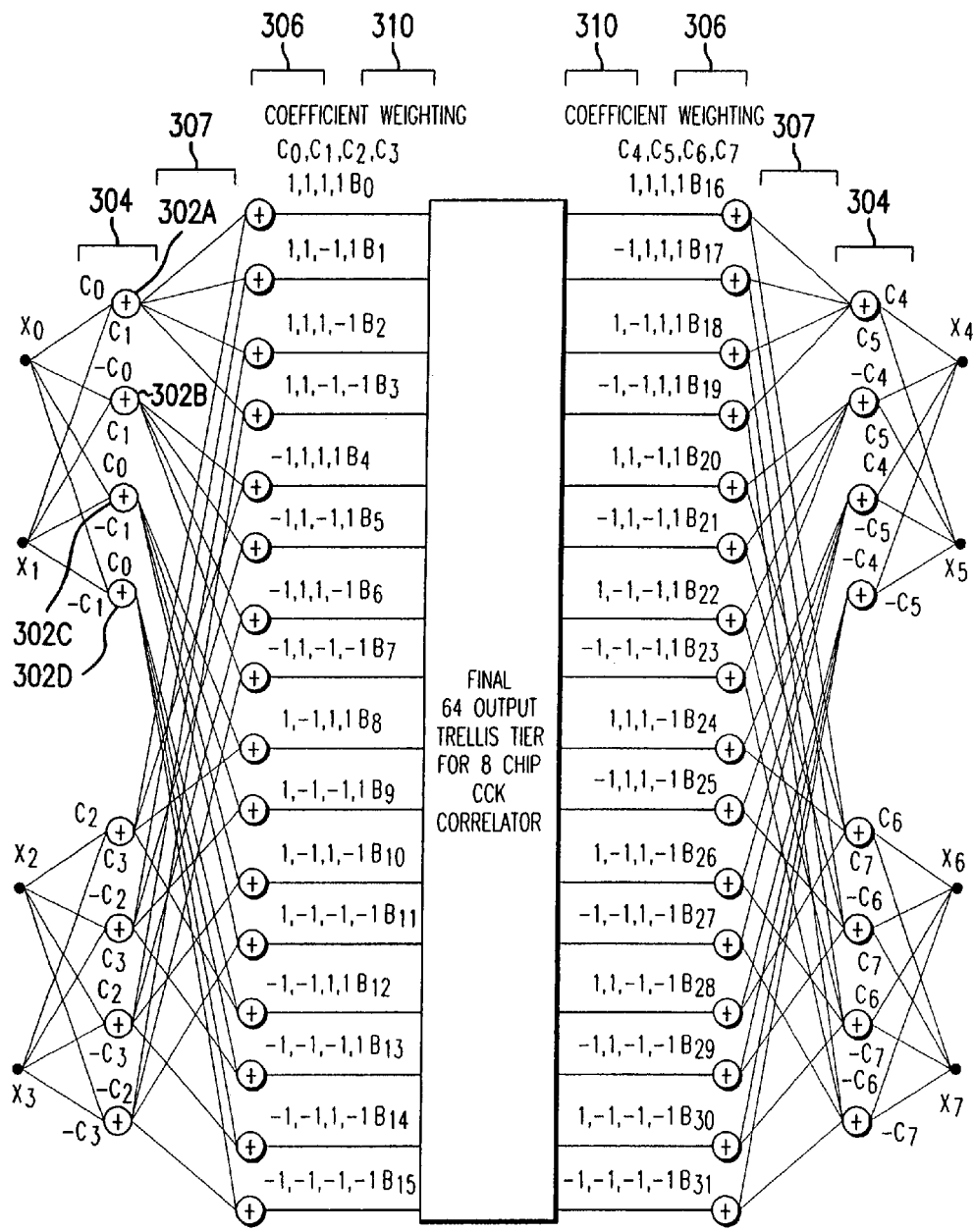
FIG. 3C illustrates an example signal flow diagram for the first and second layers illustrated in FIG. 3B.

FIG. 3C illustrates an example signal flow diagram for the FCT algorithm through the first 2 layers 304 and 306. In accordance with the example above, there are 8 input samples and 32 output correlation options through the first 2 layers 304 and 306. Correlation combinations from the upper and lower 16 4-tuples provide a final trellis with 64 8-tuple options, each representing a different CCK symbol. The option having the highest output is selected during each symbol cycle as the most likely CCK symbol. In the example embodiment, the correlation operation utilizes I and Q matched filters since the symbols are complex.

IV. Mathematical Formulation

In an embodiment, a receiver in accordance with the present invention receives a waveform and an analog-to-digital converter function samples the received waveform and converts the waveform down to baseband. The received sampled waveform may be represented from Eq. 5:

$$X_i = S_i + N_i \tag{Eq. 5}$$

Where $S_i$ represents samples from the received signal and $N_i$ represent noise sampled from an average white Gausian noise ("AWGN") process. This equation does not account for multi-path. The samples can be considered as complex, with I and Q components. The receiver output can be represented by Eq. 6:

$$Y_i = \sum_{k=0}^{n-1} C_k X(i-k) \tag{Eq. 6}$$

The coefficients, $C_k$, are considered constant for the nominal case of an AWGN channel. n is the FIR filter or correlator depth. For a case of m correlators operating on $X_i$ in parallel, Eq. 6 becomes Eq. 7:

$$Y_{i,m-1} = \sum_{k=0}^{n-1} C_{k,m-1} X(i-k) \tag{Eq. 7}$$

The mth correlator branch then contains correlator coefficients uniquely related to that branch.

Figures 4A, 4B:
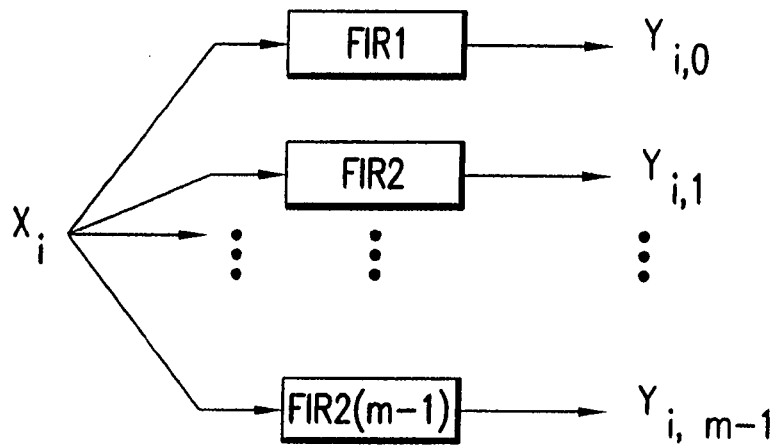
FIG. 4A illustrates a relationship between a conventional parallel correlator approach and Equation 7.
FIG. 4B illustrates an example matrix form of coefficients for a parallel correlator in accordance with an aspect of the present invention.

FIG. 4A illustrates a conventional parallel correlator approach and relates it to Eq. 7. The present invention breaks the sum over n−1 into smaller sums, typically, although not necessarily, sums of 2. The present invention applies all, or substantially all potential cross correlations and carries the 4 results forward to a subsequent level of processing. An example mathematical formulation of this operation is provided in Eq. 8;

$$Y(i)_{l,v,p,u} = \sum_{k=0}^{1} C_{k,l} X(i-k) + \sum_{k=2}^{3} C_{k,v} X(i-k) + \sum_{k=4}^{5} C_{k,p} X(i-k) + \sum_{k=6}^{7} C_{k,u}(i-k) \tag{Eq. 8}$$

Where l,v,p, and u may be considered as indices to select different coefficients. All indices should be considered in terms of a final valid code word correlation. In the 802.11 case, 256 correlation sequences are defined by Eq. 8, but the options are sifted to correspond only to valid CCK code words. FIG. 4B illustrates an example matrix form of coefficients for a parallel correlator according to the present invention.

The coefficients all take on the values of +/−1 for the examples herein. The indices are permitted to contain zeros for consistency with the original FIR formulation. The FCT sub-matrices however are simply;

$$C_{k,l} = C_{k,v} = C_{k,p} = C_{k,u} = \begin{bmatrix} 1 & -1 \\ -1 & 1 \end{bmatrix} \tag{Eq. 9}$$

The indices l,v,p,u are manipulated specifically to match the coefficients to the desired code words at the $Y(i)_{l,v,p,u}$ outputs. The indices also uniquely specify the trajectory through the signal flow path. Breaking up the original parallel matched filter coefficient matrix into the smaller 2×2 matrix permits the FCT algorithm to exploit redundant correlation operations.

V. Comparisons to the Hadamard Transform

Figure 5:
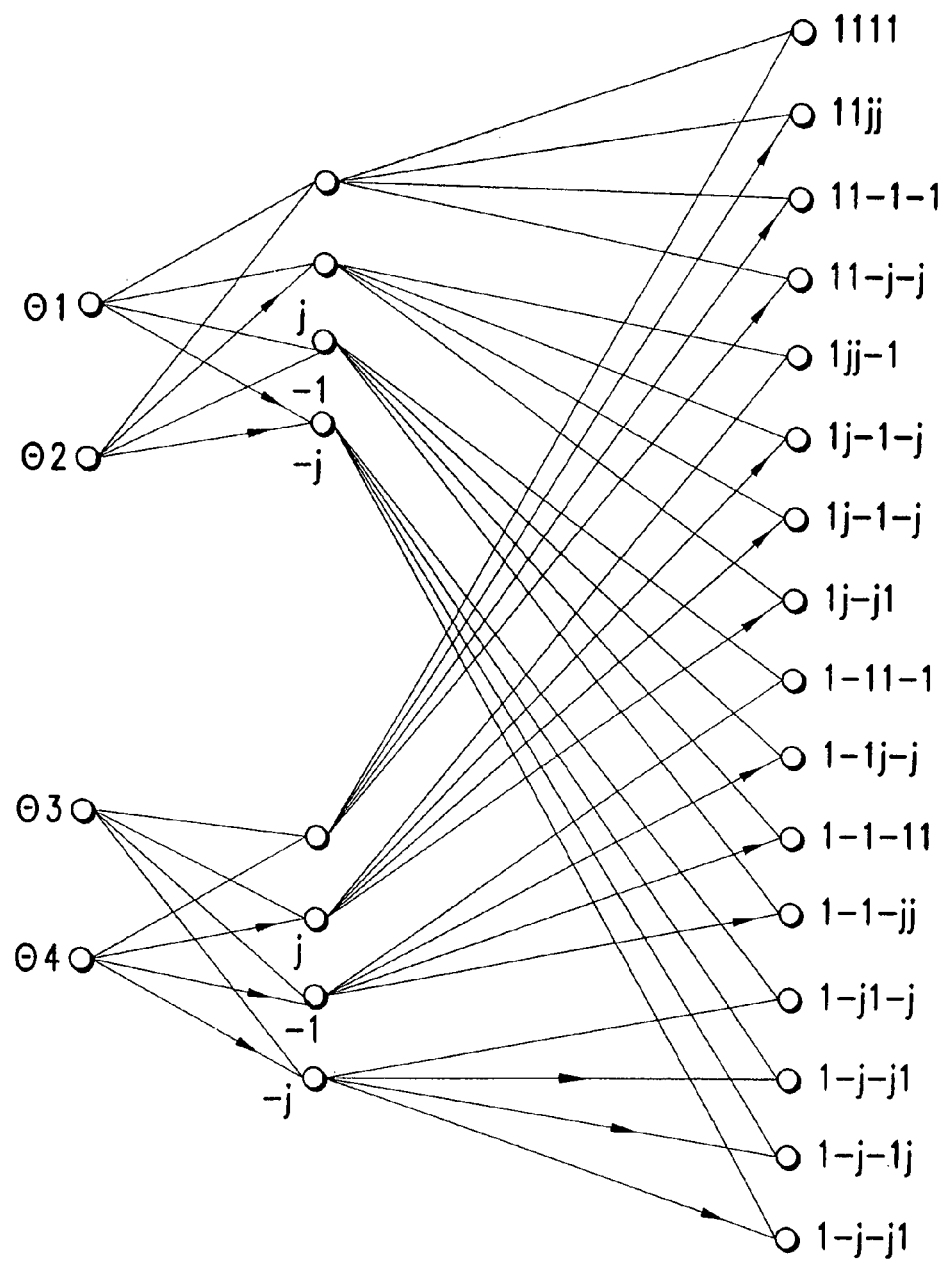
FIG. 5 illustrates an example complex fast Hadamard Transform.

An FCT algorithm trellis, in accordance with the present invention, is described above. A corresponding length 4 complex fast Hadamard Transform is illustrated in FIG. 5. As with the FCT algorithm, there are two such trellis structures corresponding to 8 input samples and 32 outputs. The 32 outputs include two 16 wide 4-tuple groupings, which are then utilized in combinations to produce the final 54 8-tuple correlations.

There are distinct differences between the two algorithms. For example, the FCT algorithm can function on arbitrary correlation words, even in matched filter scenarios, while the FWT requires certain signal coding structure. Also, the FCT algorithm permits greater efficiency because the number of adds may be tailored for a specific code set or application.

Harris and Lucent advertise an efficiency of 112 complex additions for CCK demodulation, which amounts to 2×112 additions. The bounding case for 64 arbitrary correlations with the FCT was shown to be 112, maximum. It turns out that the specific case of CCK may be accommodated using a pruned FCT algorithm having 78 additions on the in-phase correlation band and 78 additions on the quadrature correlation bank. Therefore, the FCT possesses greater redundancy for the CCK application, which is exploited to implement significantly more efficient structures.

VI. Maximum Likelihood Decoding (AWGN, No Multi-path)

The modified Fast Walsh/Hadamard Transform implements a complex trellis decoder for which maximum scores may be compared at the trellis output. Thus there are 64 distinct outputs of the trellis which are preferred based on Euclidean distance calculations along the trellis trajectories.

Only certain specific trajectories are considered up through the second tier of the trellis. The distance properties for the decoding trellis are also Euclidean for the in-phase and quadrature phase correlators. However, it is important to realize that the total distance should be calculated within the complex plane rather than simply on I independently of Q. That is, scoring is based on Eq. 10.

$$\text{Distance} \equiv \sqrt{I_{score}^2 + Q_{score}^2} \quad \text{(Eq. 10)}$$

This comes from the fact that there are pairs of I and Q chip code words which are dependent. That is the nature of the complex Walsh-Hadamard codes. Fortunately, a sufficient statistic exists which does not require the square root operation. Simply calculating the sum of the squares or estimating the vector magnitude will suffice. In this manner then the total distance or weighting through complex space is calculated. The largest output out of the 64 complex operations (weighting scenario) then becomes the most likely 8 chip complex code.

A. Magnitude Comparator

In order to determine which code symbol was most likely encoded, a magnitude compare operation is performed on the outputs from the summer 102 (FIG. 1). A variety of types of magnitude compare operations can be performed.

Figure 6:
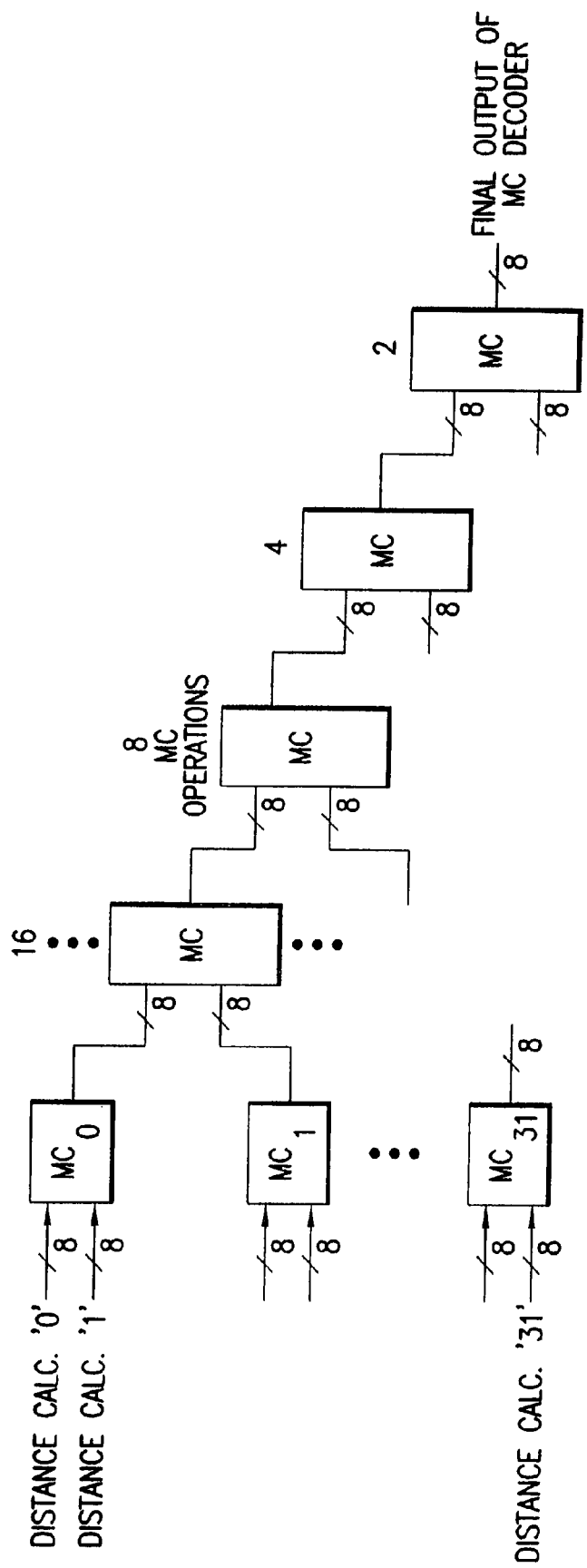
FIG. 6 illustrates an example parallel magnitude compare operation in accordance with an aspect of the invention.

FIG. 6 illustrates an example parallel magnitude compare operation in accordance with an aspect of the invention. In operation, the I and Q inputs, 8 bits wide each, for example, are squared and summed at the correlator outputs to form 64 scores. These 64 scores are compared and the largest result selected as the maximum likelihood symbol estimate. Each of the 64 outputs are assigned their corresponding chip code-to-6-bit data map. An additional di-bit is decoded from the differential phase decoder. In an embodiment, the squaring operation results in 16 bit output value when the inputs from each I and Q correlator are truncated to an extent reasonable to minimize the compare tree. In an embodiment, a parallel compare tree utilizes $\log_2(64)-1$ compares to obtain the most likely result.

In an embodiment, the magnitude compare operation illustrated in FIG. 6 utilizes a flag at each level of compare to indicate the winning local score at that level. The winning local score can be traced from the output back to one of the 64 original input correlation scores to decide which 6-bit word is most likely. In an embodiment, outcomes of tie scores at one or more levels are arbitrarily determined.. In an embodiment, magnitude compare operations are performed with an adder/subtractor to create the result C=A−B, where A and B are inputs.

Another magnitude compare technique that can be utilized is referred to herein as space slicing, which includes the steps of examining the MSB of the correlator outputs, and throwing away results not active in the MSB. If none are active in the MSB then the next MSB is compared, so on and so forth. Any surviving correlator outputs are compared in the next most significant MSB in succession until all necessary compares are exhausted. This technique is useful because it requires only 1-bit compares at each level down to the final compare. In an embodiment, 1 bit compares are performed with an exclusive OR gate. Generally, there is no deterministic way to predict the number of surviving compares which may be passed on to the next level, but the maximum number typically reduces by a factor of 2 at each level. This approach relies on a statistical distribution of scores, which may permit rapid sifting. If all of the distances are similar in magnitude then sifting typically requires more operations. For instance, if all 64 distance calculations/scores possess an active MSB then the first round of sifting will not eliminate any scores and all scores are then be compared in the next MSB. Although this is not likely to occur, it should be anticipated for associated hardware realization.

VII. Example Methods for Implementing the FCT Algorithm

Figure 8:
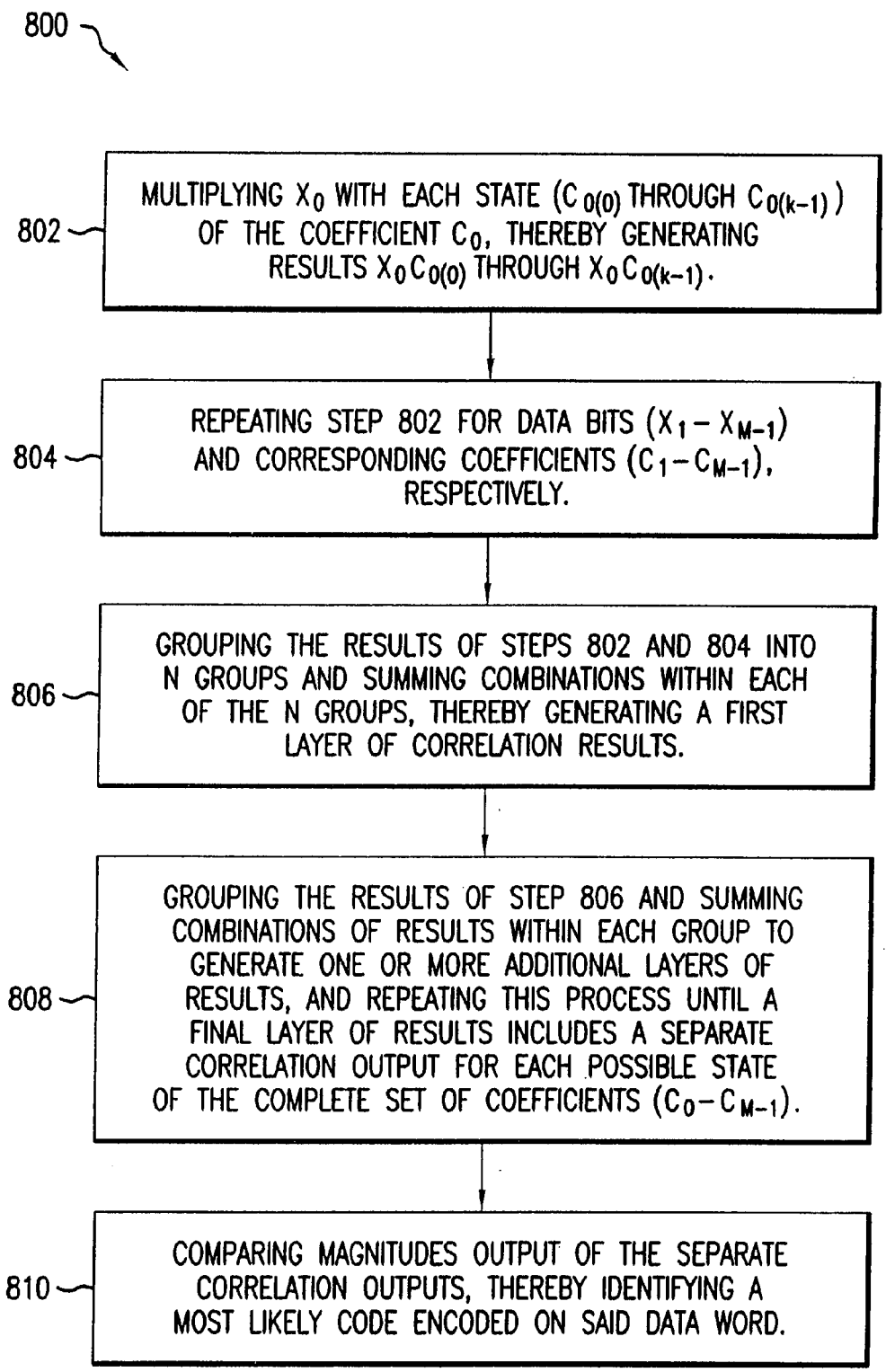
FIG. 8 illustrates an example process flowchart for implementing an FCT algorithm in accordance with an aspect of the present invention.

FIG. 8 illustrates an example process flowchart 800 for implementing the FCT algorithm in accordance with an aspect of the present invention. For illustrative purposes, the flowchart 800 is described herein with reference to one or more of the drawing figures described above. The invention is not, however, limited to the examples illustrated in the drawings. Based on the description herein, one skilled in the relevant art(s) will understand that the invention can be implemented in a variety of ways.

The example process flowchart 800 illustrates a method for correlating an encoded data word $(X_0–X_{M-1})$ with encoding coefficients $(C_0–C_{M-1})$, wherein each of $(X_0–X_{M-1})$ is represented by one or more bits and each said coefficient is represented by one or more bits, wherein each coefficient has k possible states, wherein M is greater than 1.

The process begins with step 802, which includes multiplying $X_0$ with each state $(C_{0(0)}$ through $C_{0(k-1)})$ of the coefficient $C_0$, thereby generating results $X_0C_{0(0)}$ through $X_0C_{0(k-1)}$. This is illustrated, for example, in FIGS. 3A, 3B, and 3C just prior to the kernels 302A, B, C, and D.

Step 804 includes repeating step 802 for data bits $(X_1–X_{M-1})$ and corresponding coefficients $(C_1–C_{M-1})$, respectively. This is illustrated, for example, in FIGS. 3B, and 3C just prior to the kernels 302E through 302Q.

Step 806 includes grouping the results of steps 802 and 804 into N groups and summing combinations within each of said N groups, thereby generating a first layer of correlation results. This is illustrated, for example, in FIGS. 3A, 3B, and 3C by the kernels 302, and the resultant first layer of results 307.

Step 808 includes grouping results of step 806 and summing combinations of results within each group to generate one or more additional layers of results, and repeating this process until a final layer of results includes a separate correlation output for each possible state of the complete set of coefficients $(C_0–C_{M-1})$. This is illustrated in FIG. 3C and FIG. 7, where the summers 306 generate a second layer 310, the FCT final output trellis 702 (FIG. 7) provides separate outputs for each possible state of the complete set of coefficients $(C_0–C_{M-1})$ in a final layer 704.

In an embodiment, steps 806 and 808 include the step of omitting summations that would result in invalid combinations of the encoding coefficients $(C_0–C_{M-1})$. This is illustrated, for example, in FIG. 7, wherein the second level of results 310 omits the following combinations:

$C_4C_5C_6(-C_7)$;
$C_4C_5(-C_6)(-C_7)$;
$(-C_4)C_5C6(-C_7)$;
$(-C_4)C_5(-C_6)(-C_7)$;
$C_4(-C_5)C_6(-C_7)$;
$C_4(-C_5)(-C_6)(-C_7)$;
$(-C_4)(-C_5)C_6(-C_7)$; and
$(-C_4)(-C_5)(-C_6)(-C_7)$.

In this example, the omissions eliminate performing summations for combinations that are invalid in light of the CCK code. In other embodiments, different combinations may or may not be omitted based on particular codes.

Step 810 includes comparing magnitudes of said separate correlation outputs, thereby identifying a most likely code encoded on said data word. This is illustrated, for example, in FIG. 6, by the example parallel magnitude compare operation.

In an embodiment, the process flowchart 800 further includes the step of performing steps (1) through (5) using substantially the same hardware for in-phase and quadrature phase components of the data word ($X_0$–$X_{M-1}$).

In an embodiment, the coefficients ($C_0$–$C_{M-1}$) represent real numbers. In an alternative embodiment, the coefficients ($C_0$–$C_{M-1}$) represent complex numbers.

In an embodiment, the coefficients ($C_0$–$C_{M-1}$) are represented with a single bit. Alternatively, the coefficients ($C_0$–$C_{M-1}$) are represented with multiple bits (e.g., magnitude).

In an embodiment, the coefficients ($C_0$–$C_{M-1}$) represent a cyclic code keying ("CCK") code set substantially in accordance with IEEE 802.11 WLAN standard, illustrated in the tables below.

In an embodiment, as illustrated in one or more of the prior drawing figures, M equals 8, N equal 4, and the coefficients ($C_0$–$C_{M-1}$) have two states, plus and minus.

VIII. CCK Chip Code Words

Tables are provided below that illustrate source-input data symbols, 8-bits long ($d_0$–$d_7$), and corresponding in-phase and quadrature phase 8 chip symbols used for CCK. The complex chip notation is provided for reference. In addition the algorithm flow diagram 4-tuple sums are provided since the last level of flow diagram becomes complex and difficult to follow. $B_0$ ... $B_{31}$ are the 4-tuple intermediate correlation results relating to the signal flow diagrams presented for the correlator algorithm. Two branch 4-tuples form the final output result for each correlator. $B_0$ ... $B_{15}$ provide options for the first branch component to form a final output correlator 8-tuple while $B_{16}$ ... $B_{31}$ provide the second branch component or second 4-tuple. For instance, Table 1 illustrates an example build-up:

TABLE 1

| 4-tuple Designator | 4-tuple Coefficient Sequence |
|---|---|
| $B_6$ | −1,1,1,−1 |
| $B_{28}$ | 1,1,−1,−1 |
| 4-tuple Combination | Final 8-tuple Correlator Coefficient Sequence |
| $B_6 + B_{28} \Rightarrow$ | −1,1,1,−1,1,1,−1,−1 |

Logical zeros become weighted by an arithmetic value, −1. In this manner the optimum correlator trajectory for a particular chip sequence is projected through the correlator trellis. The example above corresponds to the in-phase correlator weighting for an originally transmitted data sequence $d_0$ ... $d_7$ of 0,0,1,0,1,0,1,0. For this example, that particular branch represents a correlation provided in Eq. 11;

$$y_{42} = x_0(-1) + x_1(1) + x_2(1) + x_3(-1) + x_4(1) + x_5(1) + x_6(-1) + x_7(-1) \quad \text{(Eq. 11)}$$

$x_0$ ... $x_7$ represent corrupted or noisy input signal samples. When the $x_i$ match the coefficients significantly then that 8-tuple (1 of 64) output possesses maximum weighting and is declared most likely by the magnitude comparator. Another strategy seeks to minimize the distance between the $x_i$ and $c_i$. The process is similar in either case.

Table 2 illustrates example in-phase and quadrature 4-tuple combinations. It is noted that the examples provided in Tables 1 and 2 are provided for illustrative purposes and are not limiting. Other specific examples will be apparent to persons skilled in the relevant arts based on the teachings herein, and such other examples are within the scope and spirit of the invention.

TABLE 2

| | d0 d1 d2 d3 d4 d5 d6 d7 | In phase | 4-tuple Combination | Quadrature | 4-tuple Combination | Complex |
|---|---|---|---|---|---|---|
| $D_0$ | 00000000 | 11101101 | $B_2 + B_{20}$ | 11101101 | $B_2 + B_{20}$ | 111−111−11 |
| $D_1$ | 00000001 | 00011101 | $B_{13} + B_{20}$ | 11101101 | $B_2 + B_{20}$ | jjj−j11−11 |
| $D_2$ | 00000010 | 00011101 | $B_{13} + B_{20}$ | 00011101 | $B_{13} + B_{20}$ | −1−1−1111−11 |
| $D_3$ | 00000011 | 11101101 | $B_2 + B_{20}$ | 00011101 | $B_{13} + B_{20}$ | −j−j−jj11−11 |
| $D_4$ | 00000100 | 00100001 | $B_{14} + B_{23}$ | 11101101 | $B_2 + B_{20}$ | jj1−1jj−11 |
| $D_5$ | 00000101 | 00010001 | $B_{13} + B_{23}$ | 00101101 | $B_{14} + B_{20}$ | −1−1j−jjj−11 |
| $D_6$ | 00000110 | 11010001 | $B_1 + B_{23}$ | 00011101 | $B_{13} + B_{20}$ | −j−j−11jj−11 |
| $D_7$ | 00000111 | 11100001 | $B_2 + B_{23}$ | 11011101 | $B_1 + B_{20}$ | 11−jjjj−11 |
| $D_8$ | 00001000 | 00100001 | $B_{14} + B_{23}$ | 00100001 | $B_{14} + B_{23}$ | −1−11−1−1−1−11 |
| $D_9$ | 00001001 | 11010001 | $B_1 + B_{23}$ | 00100001 | $B_{14} + B_{23}$ | −j−jj−j−1−1−11 |
| $D_{10}$ | 00001010 | 11010001 | $B_1 + B_{23}$ | 11010001 | $B_1 + B_{23}$ | 11−11−1−1−11 |
| $D_{11}$ | 00001011 | 00100001 | $B_{14} + B_{23}$ | 11010001 | $B_1 + B_{23}$ | jj−jj−1−1−11 |
| $D_{12}$ | 00001100 | 11101101 | $B_2 + B_{20}$ | 00100001 | $B_{14} + B_{23}$ | −j−j1−1−j−j−11 |
| $D_{13}$ | 00001101 | 11011101 | $B_1 + B_{20}$ | 11100001 | $B_2 + B_{23}$ | 11j−j−j−j−11 |
| $D_{14}$ | 00001110 | 00011101 | $B_{13} + B_{20}$ | 11010001 | $B_1 + B_{23}$ | jj−11−j−j−11 |
| $D_{15}$ | 00001111 | 00101101 | $B_{14} + B_{20}$ | 00010001 | $B_{13} + B_{23}$ | −1−1−jj−j−j−11 |
| $D_{16}$ | 00010000 | 01000111 | $B_7 + B_{17}$ | 11101101 | $B_2 + B_{20}$ | j1j−1j1−j1 |
| $D_{17}$ | 00010001 | 00010111 | $B_{13} + B_{17}$ | 01001101 | $B_7 + B_{20}$ | −1j−1−jj1−j1 |
| $D_{18}$ | 00010010 | 10110111 | $B_8 + B_{17}$ | 00011101 | $B_{13} + B_{20}$ | −j−1−j1j1−j1 |
| $D_{19}$ | 00010011 | 11100111 | $B_2 + B_{17}$ | 10111101 | $B_8 + B_{20}$ | 1−j1jj1−j1 |
| $D_{20}$ | 00010100 | 00000011 | $B_{15} + B_{19}$ | 01100101 | $B_6 + B_{21}$ | −1jj−1−1j−j1 |
| $D_{21}$ | 00010101 | 10010011 | $B_9 + B_{19}$ | 00000101 | $B_{15} + B_{21}$ | −j−1−1−j−1j−j1 |
| $D_{22}$ | 00010110 | 11110011 | $B_0 + B_{19}$ | 10010101 | $B_9 + B_{21}$ | 1−j−j1−1j−j1 |
| $D_{23}$ | 00010111 | 01100011 | $B_6 + B_{19}$ | 11110101 | $B_0 + B_{21}$ | j11j−1j−j1 |
| $D_{24}$ | 00011000 | 10001011 | $B_{11} + B_{18}$ | 00100001 | $B_{14} + B_{23}$ | −j−1j−1−j−1−j1 |
| $D_{25}$ | 00011001 | 11011011 | $B_1 + B_{18}$ | 10000001 | $B_{11} + B_{23}$ | 1−j−1−j−j−1−j1 |
| $D_{26}$ | 00011010 | 01111011 | $B_4 + B_{18}$ | 11010001 | $B_1 + B_{23}$ | j1−1j−1−j1 |
| $D_{27}$ | 00011011 | 00101011 | $B_{14} + B_{18}$ | 01110001 | $B_4 + B_{23}$ | −1j1j−j−1−j1 |
| $D_{28}$ | 00011100 | 11001111 | $B_3 + B_{16}$ | 10101001 | $B_{10} + B_{22}$ | 1−jj−11−j−j1 |

TABLE 2-continued

| | d0 d1 d2 d3 d4 d5 d6 d7 | In phase | 4-tuple Combination | Quadrature | 4-tuple Combination | Complex |
|---|---|---|---|---|---|---|
| $D_{29}$ | 00011101 | 01011111 | $B_5 + B_{16}$ | 11001001 | $B_3 + B_{22}$ | j1-1-j1-j-j1 |
| $D_{30}$ | 00011110 | 00111111 | $B_{12} + B_{16}$ | 01011001 | $B_5 + B_{22}$ | -1j-j11-j-j1 |
| $D_{31}$ | 00011111 | 10101111 | $B_{10} + B_{16}$ | 00111001 | $B_{12} + B_{22}$ | -j-11j1-j-j1 |
| $D_{32}$ | 00100000 | 01000111 | $B_7 + B_{17}$ | 01000111 | $B_7 + B_{17}$ | -11-1-1-1111 |
| $D_{33}$ | 00100001 | 10110111 | $B_8 + B_{17}$ | 01000111 | $B_7 + B_{17}$ | -jj-j-j-1111 |
| $D_{34}$ | 00100010 | 10110111 | $B_8 + B_{17}$ | 10110111 | $B_8 + B_{17}$ | 1-111-1111 |
| $D_{35}$ | 00100011 | 01000111 | $B_7 + B_{17}$ | 10110111 | $B_8 + B_{17}$ | j-jjj-1111 |
| $D_{36}$ | 00100100 | 10001011 | $B_{11} + B_{18}$ | 01000111 | $B_7 + B_{17}$ | -jj-1-1-jj11 |
| $D_{37}$ | 00100101 | 10111011 | $B_8 + B_{17}$ | 10000111 | $B_{11} + B_{17}$ | 1-1-j-j-jj11 |
| $D_{38}$ | 00100110 | 01111011 | $B_4 + B_{18}$ | 10110111 | $B_8 + B_{17}$ | j-j11-jj11 |
| $D_{39}$ | 00100111 | 01001011 | $B_7 + B_{18}$ | 01110111 | $B_4 + B_{17}$ | -11jj-jj11 |
| $D_{40}$ | 00101000 | 10001011 | $B_{11} + B_{18}$ | 10001011 | $B_{11} + B_{18}$ | 1-1-1-11-111 |
| $D_{41}$ | 00101001 | 01111011 | $B_4 + B_{18}$ | 10001011 | $B_{11} + B_{18}$ | j-j-j1-111 |
| $D_{42}$ | 00101010 | 01111011 | $B_4 + B_{18}$ | 01111011 | $B_4 + B_{18}$ | -11111-111 |
| $D_{43}$ | 00101011 | 10001011 | $B_{11} + B_{18}$ | 01111011 | $B_4 + B_{18}$ | -jjjj1-111 |
| $D_{44}$ | 00101100 | 01000111 | $B_7 + B_{17}$ | 10001011 | $B_{11} + B_{18}$ | j-j-1-1j-j11 |
| $D_{45}$ | 00101101 | 01110111 | $B_4 + B_{17}$ | 01001011 | $B_7 + B_{18}$ | -11-j-jj-j11 |
| $D_{46}$ | 00101110 | 10110111 | $B_8 + B_{17}$ | 01111011 | $B_4 + B_{18}$ | -jj11j-j11 |
| $D_{47}$ | 00101111 | 10000111 | $B_{11} + B_{17}$ | 10111011 | $B_8 + B_{18}$ | 1-1jjj-j11 |
| $D_{48}$ | 00110000 | 11101101 | $B_2 + B_{20}$ | 01000111 | $B_7 + B_{17}$ | -j1-j-1-j1j1 |
| $D_{49}$ | 00110001 | 10111101 | $B_8 + B_{20}$ | 11100111 | $B_2 + B_{17}$ | 1j1-j-j-j1 |
| $D_{50}$ | 00110010 | 00011101 | $B_3 + B_{20}$ | 10110111 | $B_8 + B_{17}$ | j-1j1-j1j1 |
| $D_{51}$ | 00110011 | 01001101 | $B_7 + B_{20}$ | 00010111 | $B_3 + B_{17}$ | -1-j-1j-1j1j1 |
| $D_{52}$ | 00110100 | 10101101 | $B_{10} + B_{22}$ | 11001111 | $B_3 + B_{16}$ | 1j-j-11jj1 |
| $D_{53}$ | 00110101 | 00111101 | $B_{12} + B_{22}$ | 10101111 | $B_{10} + B_{16}$ | j-11-j1jj1 |
| $D_{54}$ | 00110110 | 00011101 | $B_5 + B_{22}$ | 00111111 | $B_{12} + B_{16}$ | -1-jj11jj1 |
| $D_{55}$ | 00110111 | 11001001 | $B_3 + B_{22}$ | 01011111 | $B_5 + B_{16}$ | -j1-1j1jj1 |
| $D_{56}$ | 00111000 | 00100001 | $B_{14} + B_{23}$ | 10001011 | $B_{11} + B_{18}$ | j-1-j-1j-1j1 |
| $D_{57}$ | 00111001 | 01110001 | $B_4 + B_{23}$ | 00101011 | $B_{14} + B_{18}$ | -1-j1-jj-1j1 |
| $D_{58}$ | 00111010 | 11101001 | $B_1 + B_{23}$ | 01111011 | $B_4 + B_{18}$ | -j1j1j-1j1 |
| $D_{59}$ | 00111011 | 10000001 | $B_{11} + B_{23}$ | 11011011 | $B_1 + B_{18}$ | 1j-1jj-1j1 |
| $D_{60}$ | 00111100 | 01100101 | $B_6 + B_{21}$ | 00000011 | $B_{15} + B_{19}$ | -1-j-j-1-1-jj1 |
| $D_{61}$ | 00111101 | 11110101 | $B_0 + B_{21}$ | 01100011 | $B_6 + B_{19}$ | -j11-j-1-jj1 |
| $D_{62}$ | 00111110 | 10010101 | $B_9 + B_{21}$ | 11110011 | $B_0 + B_{19}$ | 1jj1-1-jj1 |
| $D_{63}$ | 00111111 | 00000101 | $B_{15} + B_{21}$ | 10010011 | $B_9 + B_{19}$ | j-1-1j-1-jj1 |

IX CONCLUSION

While various embodiments of the present invention have been described above, it should be understood that they have been presented by way of example only, and not limitation. Other embodiments are possible and are covered by the invention.

What is claimed is:

1. A method for correlating an encoded data word $(X_0, \ldots, X_{M-1})$ with encoding coefficients $(C_0, \ldots, C_{M-1})$, wherein each of the encoding coefficients has possible states, wherein M is greater than 1, comprising:

(1) generating in parallel the results of the summation $$X_0C_0 + X_1C_1 + \ldots + X_{M-1}C_{M-1}$$

for all valid combinations of the encoding coefficients $(C_0, \ldots, C_{M-1})$, omitting summations that result in invalid combinations of the encoding coefficients $(C_0, \ldots, C_{M-1})$; and (2) identifying the combination of encoding coefficients corresponding to a maximum result as the encoding combination.

2. The method of claim 1, wherein step (1) comprises:

(a) multiplying each of $X_0, \ldots, X_{M-1}$ by all possible states of respective coefficient $C_0, \ldots, C_{M-1}$, thereby generating (M×k) results;

(b) grouping the results and summing valid combinations thereof within each group, thereby generating a first layer of correlation kernels; and (c) repeating step (b) until each of the correlation kernels includes a combination of every one of $X_0, \ldots, X_{M-1}$.

3. The method of claim 2, wherein the number of correlation kernels resulting after step (b) is in accordance with:

$$Nk = n!/[r!(n-r)!] - L$$

wherein:
    n represents the number of results in a group;
    r represents the number of summing elements per correlation kernel; and
    L represents the number of invalid combinations within the group.

4. The method of claim 2, wherein step (b) comprises omitting the summation of one or more combinations of the results.

5. The method of claim 4, wherein the omitted summations represent summations of invalid combinations of one or more of $C_0, \ldots, C_{M-1}$ based on the encoding code specification.

6. The method of claim 1, wherein the valid combinations represent combinations valid in accordance with an encoding code specification.

7. The method of claim 1, wherein invalid combinations represent combinations invalid in accordance with an encoding code specification.

8. The method of claim 1, wherein step (2) comprises a maximum likelihood decoding process.

9. The method of claim 8, wherein step (2) comprises:
    comparing the magnitudes of the results corresponding to valid combinations of the encoding coefficients.

10. The method of claim 9, wherein the comparing of the magnitudes comprises a space slicing process, wherein:

(1) the most significant bit (MSB) of the magnitudes is examined and magnitudes not active in the MSB are eliminated; and (2) step (1) is repeated with the next most significant bit as the MSB until the maximum magnitude is determined.

11. The method of claim 9, wherein the comparing of the magnitudes comprises a parallel magnitude compare process with $(\log_2 L)-1$ magnitude compare operations, wherein L is the total number of results.

12. The method of claim 11, wherein the comparing of the magnitudes comprises comparing two results by creating the difference between the two.

13. The method of claim 1, wherein the encoding coefficients represent binary coefficients having one of two possible values.

14. The method of claim 13, wherein the encoding coefficients represent a cyclic code keying (CCK) code set.

15. The method of claim 1, wherein the encoding coefficients represent M-ary coefficients having one of M possible values.

16. The method of claim 1, wherein one or more of $C_0, \ldots, C_{M-1}$ are hard-coded constant values.

17. The method of claim 1, wherein one or more of $C_0, \ldots, C_{M-1}$ are soft-coded variable values.

18. The method of claim 1, wherein $C_0, \ldots, C_{M-1}$ represent real numbers.

19. The method of claim 1, wherein $C_0, \ldots, C_{M-1}$ represent complex numbers.

20. A method for accelerating the parallel correlation of an encoded data word $(X_0, \ldots, X_{M-1})$ with encoding coefficients $C_0, \ldots, C_{M-}$, wherein each of the encoding coefficients has k possible states, wherein M is greater than 1, comprising:

(a) generating in parallel the results of the multiplication of each of $X_0, \ldots, X_{M-1}$ with respective encoding coefficient $C_0, \ldots, C_{M-1}$ for all k possible states of the encoding coefficient;

(b) grouping the results and summing only valid combinations thereof within each group, thereby reducing the number of addition operations; and (c) repeating step (b) until a final layer of results is generated.

21. A system for correlating an encoded data word $(X_0, \ldots, X_{M-1})$ with a cyclic code coefficient set $(C_0, \ldots, C_{M-1})$ in accordance with IEEE 802.11 WLAN standard, wherein each coefficient in the coefficient set has k possible states, comprising:

means for generating in parallel the results of the summation $$X_0 C_0 + X_1 C_1 + \ldots + X_{M-1} C_{M-1}$$

for all valid combinations of the coefficient set $(C_0, \ldots, C_{M-})$; and means for identifying the combination of the coefficient set corresponding to a maximum result as the encoding combination.

22. The system of claim 21, wherein means for generating comprises:

means for multiplying each of $X_0, \ldots, X_{M-1}$ by all possible states of respective coefficient $C_0, \ldots, C_{M-1}$; and means for grouping the results and summing valid combinations thereof within each group.

23. The system of claim 21, wherein means for identifying comprises:

means for comparing magnitudes of the results corresponding to valid combination of the combination set.

* * * * *

UNITED STATES PATENT AND TRADEMARK OFFICE
CERTIFICATE OF CORRECTION

PATENT NO.       : 7,233,969 B2                                     Page 1 of 1
APPLICATION NO.  : 11/107861
DATED            : June 19, 2007
INVENTOR(S)      : Rawlins et al.

It is certified that error appears in the above-identified patent and that said Letters Patent is hereby corrected as shown below:

Title page
Item [*], Notice section missing reference to terminal disclaimer, please add --This patent is subject to a Terminal Disclaimer--.

Item [56], References Cited, FOREIGN PATENT DOCUMENTS section please replace "WO 98/535566 A2" with --WO 98/53556 A2--.

Signed and Sealed this

Fourth Day of September, 2007

JON W. DUDAS
*Director of the United States Patent and Trademark Office*